(12) United States Patent
Watanabe et al.

(10) Patent No.: US 6,654,319 B1
(45) Date of Patent: Nov. 25, 2003

(54) DISC RECORDING AND/OR REPRODUCING APPARATUS HAVING CONTROL PLATES AND SPACE FORMING FEATURES

(75) Inventors: Tomohiro Watanabe, Kanagawa (JP); Kazuyuki Takizawa, Chiba (JP); Takayuki Ishibashi, Chiba (JP); Yoshiteru Taka, Chiba (JP); Toru Hama, Kanagawa (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 09/831,885

(22) PCT Filed: Sep. 28, 2000

(86) PCT No.: PCT/JP00/06678
§ 371 (c)(1),
(2), (4) Date: May 22, 2001

(87) PCT Pub. No.: WO01/24176
PCT Pub. Date: Apr. 5, 2001

(30) Foreign Application Priority Data

Sep. 29, 1999 (JP) .................................. 11-276286

(51) Int. Cl.$^7$ .............................................. G11B 17/26
(52) U.S. Cl. ................................ 369/30.85; 369/30.89; 369/30.81; 369/30.78
(58) Field of Search ........................... 369/30.34, 30.35, 369/30.78, 30.81, 30.85, 30.87, 30.89

(56) References Cited

U.S. PATENT DOCUMENTS 5,726,967 A * 3/1998 Tanaka et al. ............... 369/192
6,337,843 B2 * 1/2002 Yoshida et al. ......... 369/178.01

FOREIGN PATENT DOCUMENTS

| JP | 61-261861 | 11/1986 | |
| JP | 03235250 A | * 10/1991 | ........... G11B/17/26 |
| JP | 8-306114 | 11/1996 | |
| JP | 10-55593 | 2/1998 | |
| JP | 10149606 A | * 6/1998 | ........... G11B/17/26 |

* cited by examiner

Primary Examiner—William Klimowicz
(74) Attorney, Agent, or Firm—Oblon, Spivak, McClelland, Maier & Neustadt, P.C.

(57) ABSTRACT

In an on-vehicle disc player having a disc elevator (22) for making a plurality of disc carrying devices each having a CD placed on it stacked one over another, for example, in the vertical direction move in the stacking direction and a holding device (14) for holding and rotationally driving a CD, the disc player is provided with an inner slider (139) which moves in a direction (plane direction of a disc) perpendicular to the direction of stacking the disc carrying devices and makes the disc elevator (22) and the holding device (14) move in the stacking direction, a separating cam (82) which separates the stacked disc carrying devices to form a specified space, and an outer slider (140) which is coupled to the separating cam (82) and moves in a plane direction of a disc is provided.

16 Claims, 33 Drawing Sheets

(a)

(b)

(a)

(b)

(a)

(b)

(a)

(b)

(c)

(a)

(b)

(a)

(b)

(a)

(b)

(a)

(b)

(a)

(b)

(a)

(b)

(a)

(b)

(a)

(b)

DISC RECORDING AND/OR REPRODUCING APPARATUS HAVING CONTROL PLATES AND SPACE FORMING FEATURES

TECHNICAL FIELD

The present invention relates to a disc recording and/or reproducing apparatus for storing in it and recording and/or reproducing a plurality of discs.

BACKGROUND ART

As a disc recording and/or reproducing apparatus mounted on a vehicle for the purpose of playing a sound, there is a disc player. Such a disc player uses a method of storing a plurality of discs, for example, compact discs (hereinafter referred to as CDs) in a magazine and replacing a plurality of CDs in one magazine together at a time. Due to this, since it is made large-sized, its main body portion is stored in a trunk, while only portions necessary for operation are installed in a passenger compartment. However, since CDs cannot be replaced when a vehicle is traveling, it is necessary to stop the vehicle and open the trunk for the replacement, and this is troublesome.

Due to this, an on-vehicle disc player to be put in a vehicle compartment has been developed in recent years. An on-vehicle disc player is demanded to store a plurality of CDs in it and is put in a specified space of the dashboard in a passenger compartment. Therefore, it has been an important problem to make an on-vehicle disc player small-sized.

Such an on-vehicle disc player forms a disc storing portion by stacking one over another, for example, six trays (disc carrying means) each carrying a CD on it in an enclosure (case) being nearly in the shape of a rectangular parallelepiped having a fixed size called size 1 DIN or the like for example, and makes it possible to individually insert and eject the six CDs and makes it possible to select and reproduce one out of the six CDs.

However, since the on-vehicle disc player must contain in it a plurality of CDs and components related to control of the respective mechanisms for performing many operations such as insertion, ejection, reproducing (recording) and the like of a CD, it has been difficult to make the whole apparatus small-sized.

DISCLOSURE OF THE INVENTION

An object of the present invention is to provide a disc recording and/or reproducing apparatus simplified in composition and made small in size.

A disc recording and/or reproducing apparatus of the present invention is characterized by a disc recording and/or reproducing apparatus comprising: a disc storing portion having a plurality of disc carrying means each having a disc placed on it, the disc carrying means being stacked one over another; a driving portion which is apart by a specified distance from the disc carrying means in a direction perpendicular to the stacking direction of the disc carrying means, faces the disc storing portion, is disposed so as to move in the same direction as the stacking direction, and holds and rotationally drives a disc; a first control plate which moves in a direction nearly perpendicular to the stacking direction of the disc carrying means and makes the disc storing portion and the driving portion move in the stacking direction; a space forming means which makes a disc carrying means adjacent to a desired disc carrying means in the disc storing portion move in the stacking direction and forms a specified space at least at one side of the desired disc carrying means in the stacking direction; and a second control plate which is coupled to the space forming means and moves in a direction perpendicular to the stacking direction.

Further, a disc recording and/or reproducing apparatus of the present invention is characterized by a disc recording and/or reproducing apparatus comprising: a disc storing portion having a plurality of disc carrying means each having a disc placed on it, the disc carrying means being stacked one over another; a driving portion which is apart by a specified distance from the disc carrying means in a direction perpendicular to the stacking direction of the disc carrying means, faces the disc storing portion, is provided so as to move in the same direction as the stacking direction, and holds and rotationally drives a disc; a first control plate which moves in a direction nearly perpendicular to the stacking direction of the disc carrying means and makes the disc storing portion and the driving portion move in the stacking direction; a space forming means which makes a disc carrying means adjacent to a desired disc carrying means in the disc storing portion move in the stacking direction and forms a specified space at least at one side of the desired disc carrying means in the stacking direction; and a second control plate which is coupled to the space forming means and moves in a direction perpendicular to the stacking direction; wherein the first control plate has a position control portion for controlling the disc storing portion and the driving portion to move to desired positions in the stacking direction according to the distance of its movement.

Further, a disc recording and/or reproducing apparatus of the present invention is characterized by a disc recording and/or reproducing apparatus comprising: a disc storing portion having a plurality of disc carrying means each having a disc placed on it, the disc carrying means being stacked one over another; a driving portion which is apart by a specified distance from the disc carrying means in a direction perpendicular to the stacking direction of the disc carrying means, faces the disc storing portion, is provided so as to move in the same direction as the stacking direction, and holds and rotationally drives a disc; a first control plate which moves in a direction nearly perpendicular to the stacking direction of the disc carrying means and makes the disc storing portion and the driving portion move in the stacking direction; a space forming means which makes a disc carrying means adjacent to a desired disc carrying means in the disc storing portion move in the stacking direction and forms a specified space at least at one side of the desired disc carrying means in the stacking direction; and a second control plate which is coupled to the space forming means and moves in a direction perpendicular to the stacking direction; wherein the second control plate has a mode changeover portion having a specified length for changing over the operation mode of the first control plate between a mode for moving the disc storing portion and a mode for moving only the driving portion.

Further, a disc recording and/or reproducing apparatus of the present invention is characterized by a disc recording and/or reproducing apparatus comprising: a disc storing portion having a plurality of disc carrying means each having a disc placed on it, the disc carrying means being stacked one over another; a driving portion which is apart by a specified distance from the disc carrying means in a direction perpendicular to the stacking direction of the disc carrying means, faces the disc storing portion, is provided so as to move in the same direction as the stacking direction, and holds and rotationally drives a disc; a first control plate which moves in a direction nearly perpendicular to the stacking direction of the disc carrying means and makes the disc storing portion and the driving portion move in the stacking direction; a space forming means which makes a disc carrying means adjacent to a desired disc carrying means in the disc storing portion move in the stacking direction and forms a specified space at least at one side of the desired disc carrying means in the stacking direction; and a second control plate which is coupled to the space forming means and moves in a direction perpendicular to the stacking direction; wherein the space forming means and the second control plate are coupled to each other so that they can move in the stacking direction.

Further, a disc recording and/or reproducing apparatus of the present invention is characterized by a disc recording and/or reproducing apparatus comprising: a disc storing portion having a plurality of disc carrying means each having a disc placed on it, the disc carrying means being stacked one over another; a driving portion which is apart by a specified distance from the disc carrying means in a direction perpendicular to the stacking direction of the disc carrying means, faces the disc storing portion, is provided so as to move in the same direction as the stacking direction, and holds and rotationally drives a disc; a first control plate which moves in a direction nearly perpendicular to the stacking direction of the disc carrying means and makes the disc storing portion and the driving portion move in the stacking direction; a space forming means which makes a disc carrying means adjacent to a desired disc carrying means in the disc storing portion move in the stacking direction and forms a specified space at least at one side of the desired disc carrying means in the stacking direction; and a second control plate which is coupled to the space forming means and moves in a direction perpendicular to the stacking direction; wherein the first control plate comprises a pair of the first control plates being driven by a first driving source and the second control plate comprises a pair of the second control plates being driven by a second driving source.

BRIEF DESCRIPTION OF THE DRAWINGS

FIG. 6 is an exploded perspective view of a transfer means, a turning force supplying means and the like;

BEST MODE FOR CARRYING OUT THE INVENTION

Figure 1:
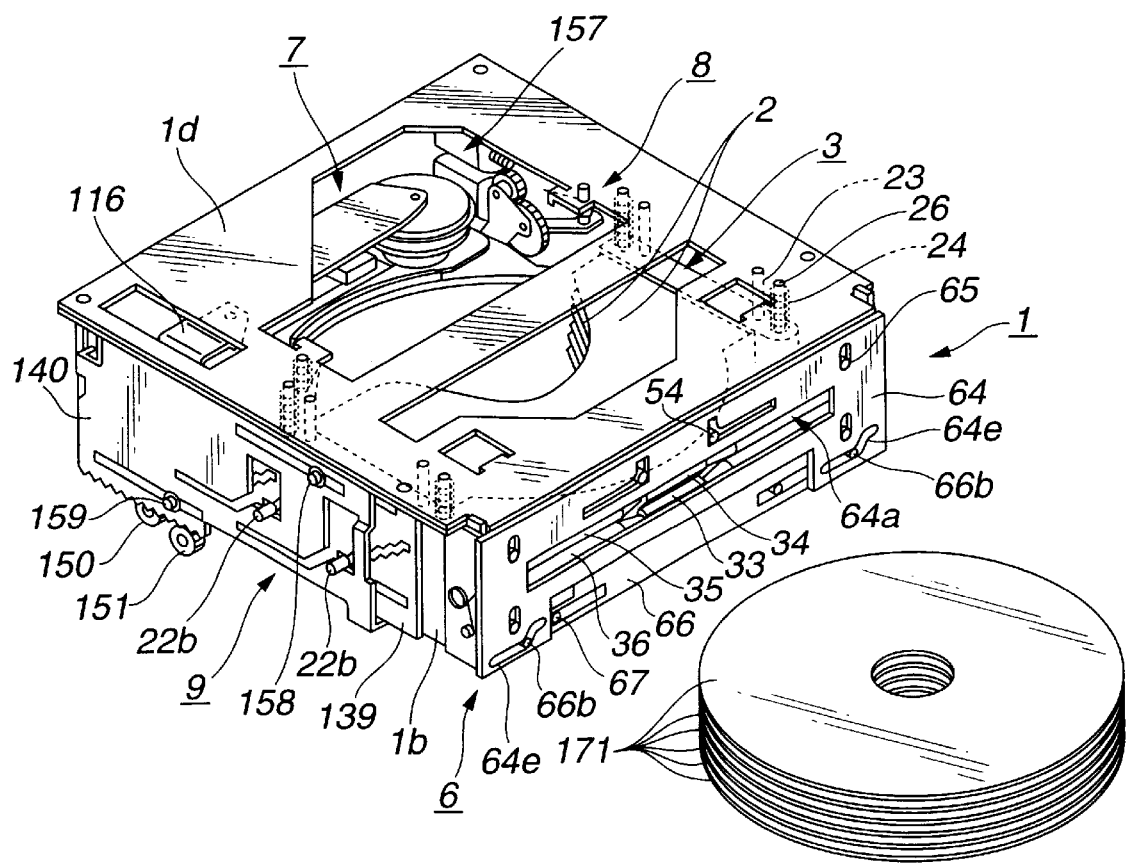
FIG. 1 is a perspective view of the appearance of a disc player showing an embodiment of a disc recording and/or reproducing apparatus according to the present invention.

An embodiment of a disc recording and/or reproducing apparatus according to the present invention is described with reference to the drawings in the following.

This embodiment is a disc player for reproducing a sound which the present invention is applied to.

(A) Whole composition of a Disc Player

As shown in FIGS. 1 to 11, in a broad way a disc player comprises a case 1 for forming its appearance, a disc storing portion 3 disposed at the front part in the case 1 and consisting of a plurality of trays 2 (disc carrying means) each of which carries a CD, a transfer means 5 provided at an insertion/ejection opening 4 of the front face plate 1a of the case 1 and inserting or ejecting a CD into or from the disc storing portion 3, an opening/closing means 6 provided at the front side of the transfer means 5 and opening or closing the insertion/ejection opening 4 of the front face plate 1a, a reproducing means 7 provided at the back part in the case 1 and selecting and reproducing one out of CDs in the disc storing portion 3, a pushing-out means 8 being provided at the right and left sides of the back of the disc storing portion 3 and pushing out a CD to be ejected toward the transfer means 5, and an operation means 9 provided mainly outside the right and left side plates 1b and 1c of the case 1 and operating the disc storing means 3, the reproducing means 7 and the like.

Said reproducing means 7 comprises a space forming means 11 disposed at both sides of a pickup elevator 10 rising and lowering for forming space over and under a CD to be reproduced out of a plurality of CDs in the disc storing portion 3, a holding means 14 (driving portion) which comprises an upper arm 12 and a lower arm 13 rotatably provided on the pickup elevator 10 and enters said space and holds a selected CD, a CD driving means 15 (driving portion) being attached to said lower arm 13 and rotationally driving a CD held, a pickup unit 16 being provided on said lower arm 13 and reading information from a rotating CD, a turning force supplying means 17 for transferring a driving force of said transfer means 5 to the holding means 14 to turn a CD only in the reproducing mode out of the insertion/ejection mode being a state for inserting/ejecting a CD and the reproducing mode being a state for reproducing a CD, and a regulation means 18 for setting the time when the holding means 14 holds a CD.

(B) Case

First, the case 1 is described. The case 1 comprises a front face plate 1a, side plates 1b and 1c, a ceiling plate 1d and a bottom plate 1e, and its back is opened. And the side plates 1b, 1c and the bottom plate 1e are formed into one body.

(C) Disc Storing Portion

As shown in FIG. 3(a), in this embodiment, the disc storing portion 3 comprises six trays 2 each being a disc carrying means and a disc elevator 22 carrying the six trays 2, and at the front part of the case 1, four guide poles 23 along the vertical direction as a supporting means are supported by joining both their ends to the bottom plate 1e and the ceiling plate 1d.

Figure 4:
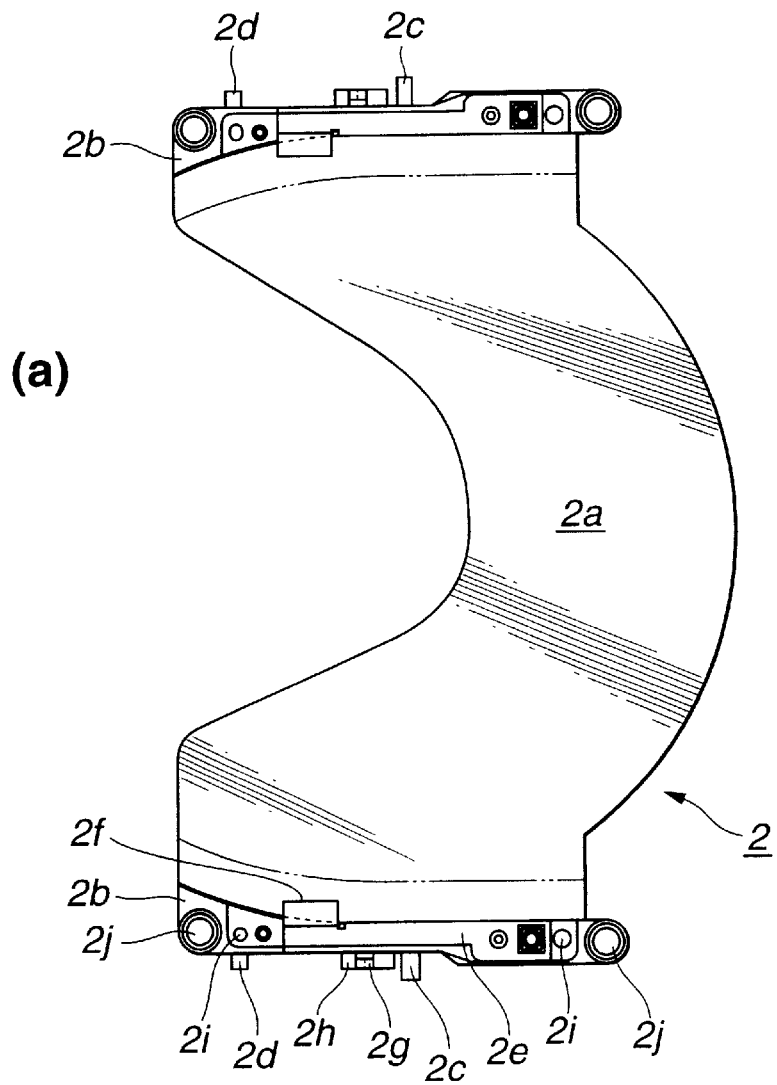
FIG. 4 shows the disc storing portion of the disc player, and figure (a) thereof is a plan view of it and figure (b) thereof is a front view.
Figure 4:
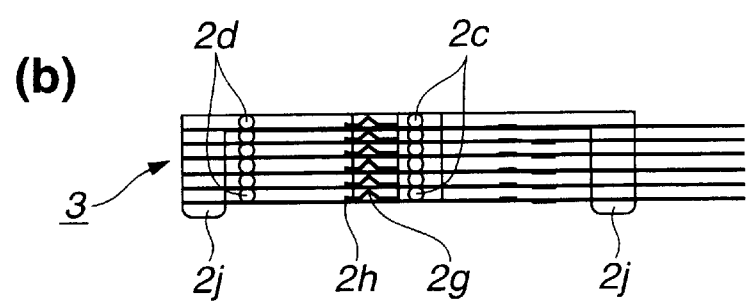

As shown in FIG. 4, each tray 2 is formed by adhering a resin member 2b to the upper face of each of both side parts of a thin aluminum plate 2a. A pair of pins 2c and 2d projecting sidewards are formed at a middle part and the backward part of each resin member 2b, and the pins being at the middle part are longer and the pins being at the backward part are shorter. The height of the resin member 2b is set nearly at the same as the thickness of a CD, and the front part of a plate spring 2e (holding means for holding a disc) for holding a CD between the resin member 2b and the aluminum plate 2a is fixed on the upper face of the resin member 2b.

A pressing portion 2f for pressing a CD is formed on the inside of the backward part of the plate spring 2e, while a receiving portion 2g to be pressed down by the lower face of a separating cam 82 described later and a receiving portion 2h to receive an upward force by the lower face of an upper stage entering portion 82j described later are formed on the outside of the back part of the plate spring 2e. Guide holes 2i for having said guide poles 23 inserted through into them are formed so as to pass through the resin member 2b and the aluminum plate 2a respectively at the front part and the back part of the resin member 2b.

A shock absorbing member unshown is adhered along a circular arc to parts of both faces of the aluminum plate 2a which the vicinity of the outer circumferential face of a CD is brought into contact with. At both ends of the resin member 2b on the top tray 2, as shown in FIG. 3(a), cylindrical spring receivers 2j each receiving a coil spring 24 as an energizing means provided between the ceiling plate 1d and the top tray 2 are formed into one body with the resin member 2b, and as shown in FIG. 3(b), the bottom of the spring receiver 2j projects slightly inside to form a receiving part 2k and this receiving part 2k receives the lower end of the coil spring 24. This is provided in order to prevent a load necessary for compressing the spring from becoming too large even if the length of compression is made large by using a long spring as the spring.

On the other hand, the disc elevator 22 is formed in a shape in which the right and left end parts of it are bent upward. Guide holes 22a for having said guide poles 23 inserted through into them are formed in the horizontal part of it and a pair of pins 22b projecting horizontally for lifting and lowering the disc elevator 22 are fixed on the outside of each of the right and left vertical parts. The pair of pins 22b are inserted through into two vertical slits 25 formed in each of the side plates 1b and 1c of the case 1 to project outside the case 1.

Said disc elevator 22 and six trays 2 are supported so as to be freely lifted and lowered by inserting the guide poles 23 through into these guide holes 22a and 2i. And the upper and lower ends of four spring guides 26 are fixed respectively on the ceiling plate 1d and the bottom plate 1e of the case 1, and the spring guides 26 are respectively inserted through into the spring receivers 2j. And the lower end of a coil spring 24 as an energizing means provided so as to surround the spring guide 26 is in contact with said receiving part of the lower end of the spring receiver 2j.

(D) Transfer Means

Figure 2:
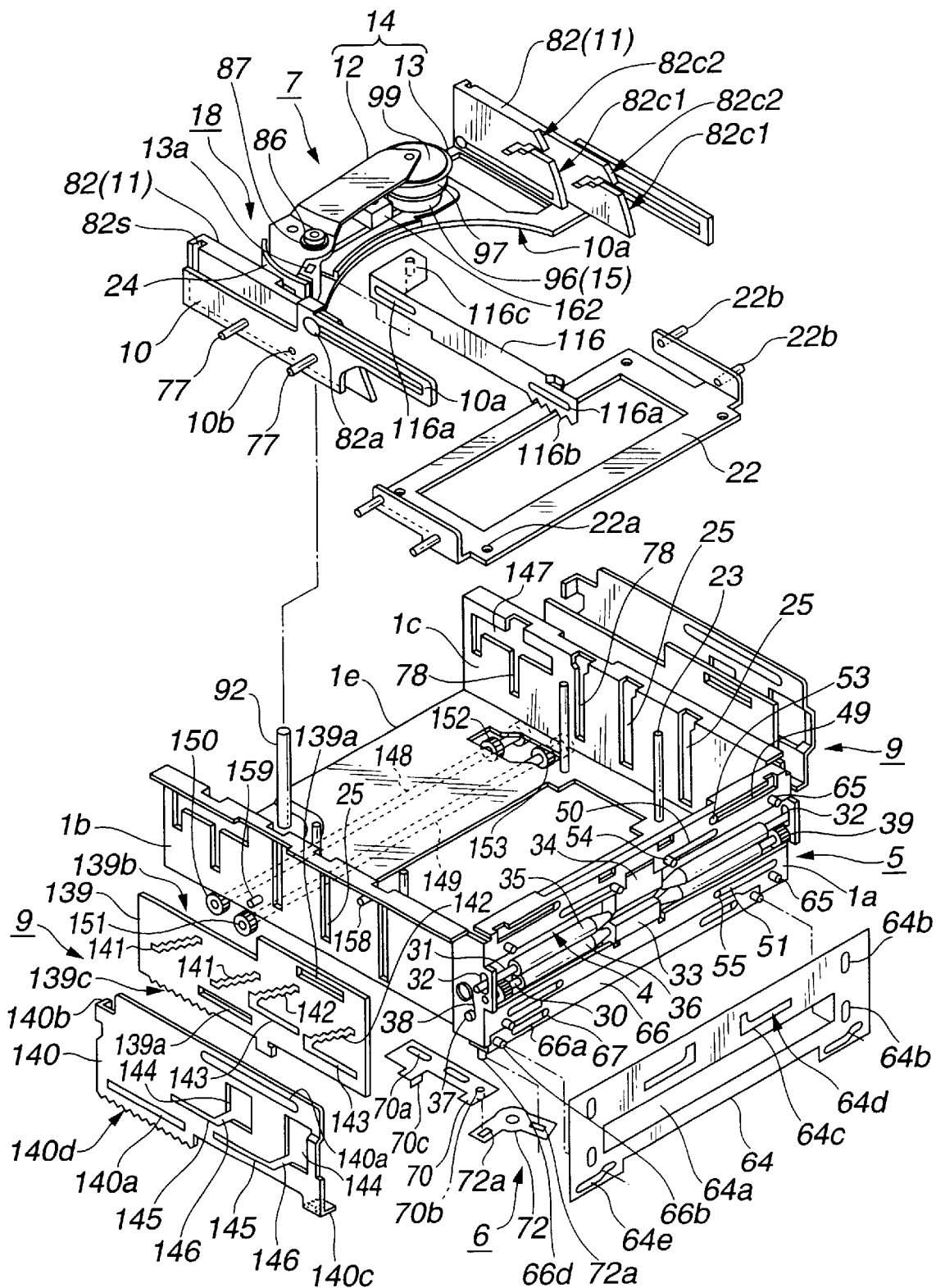
FIG. 2 is an exploded perspective view of the disc player.

As shown in FIG. 2, the transfer means 5 is provided on the front face plate 1a of the case 1. The front face plate 1a has the insertion/ejection opening 4 formed in it. A driving shaft 30 and a driven shaft 31 are rotatably supported at the insertion/ejection opening 4. Both ends of the driving shaft 30 are rotatably attached to the front face plate 1a. Both ends of the driven shaft 31 are inserted into slots 32 formed long in the vertical direction in the sides of the front face plate 1a.

Figure 5:
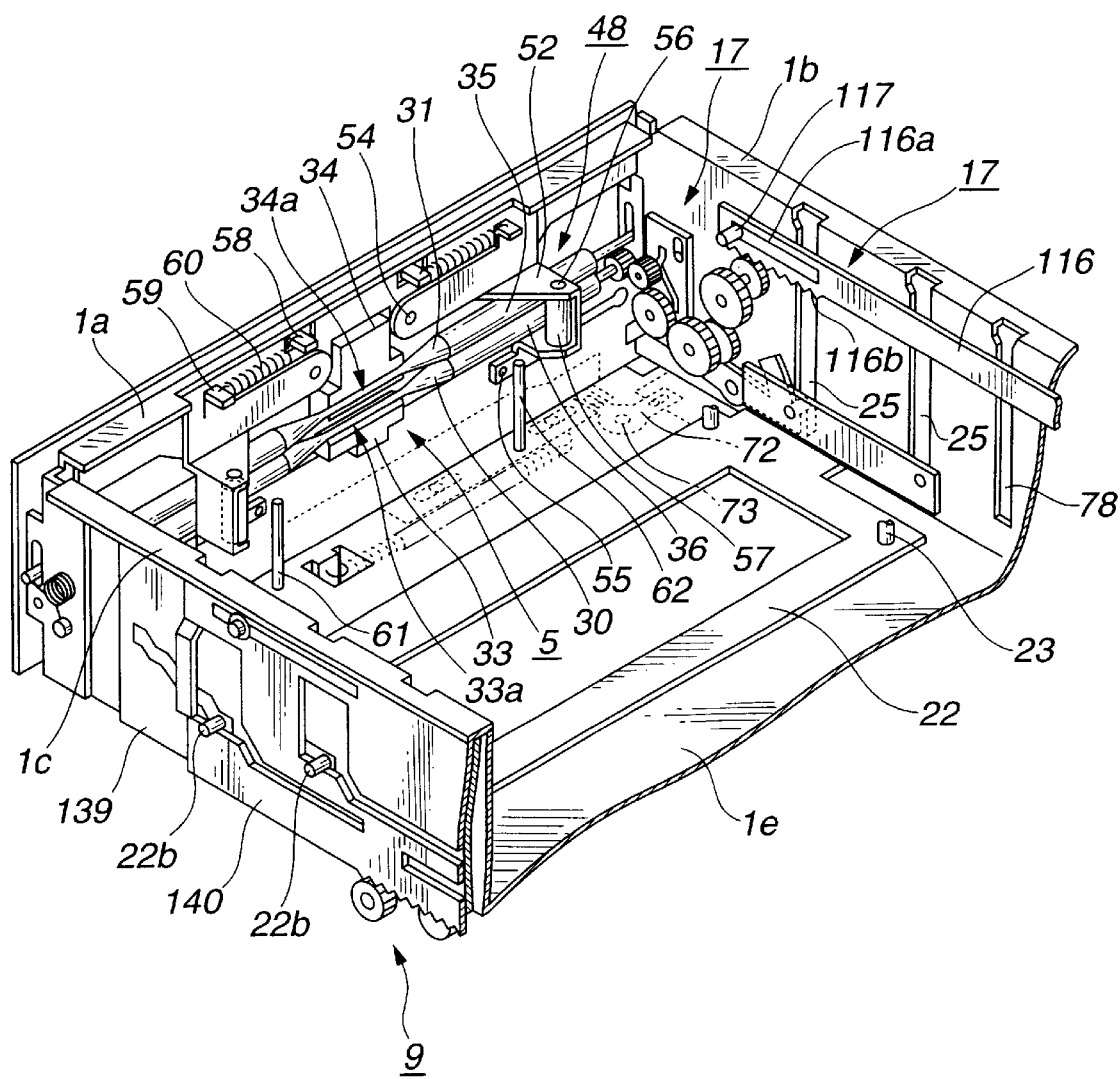
FIG. 5 is a perspective view of the inside of the forward portion of the case seen from the back side.

In order to support the middle parts of the driving shaft 30 and the driven shaft 31, as shown in FIG. 5, a small-diameter portion in a middle part of the driving shaft 30 is rotatably fitted into a groove 33a in the back part of a resin bearing 33 restricted in downward movement, while a small-diameter portion in a middle part of the driven shaft 31 is rotatably fitted into a groove 34a in the back part of a resin bearing 34 capable of freely moving up and down through a pair of guide projections and a pair of grooves being unshown.

A pair of rollers 35 made of resin are attached to the driven shaft 31 and a pair of rollers 36 made of rubber are attached to the driving shaft 30, and both of them are restricted by unshown stop rings in sliding in the axial directions. A circumferential groove is formed in each end of the driven shaft 31 and both ends of a spring 38 for pressing the driven shaft 31 toward the driving shaft 30 are engaged with the circumferential groove and a spring engaging pin 37 fixed on each side of the front face plate 1a.

Figure 6:
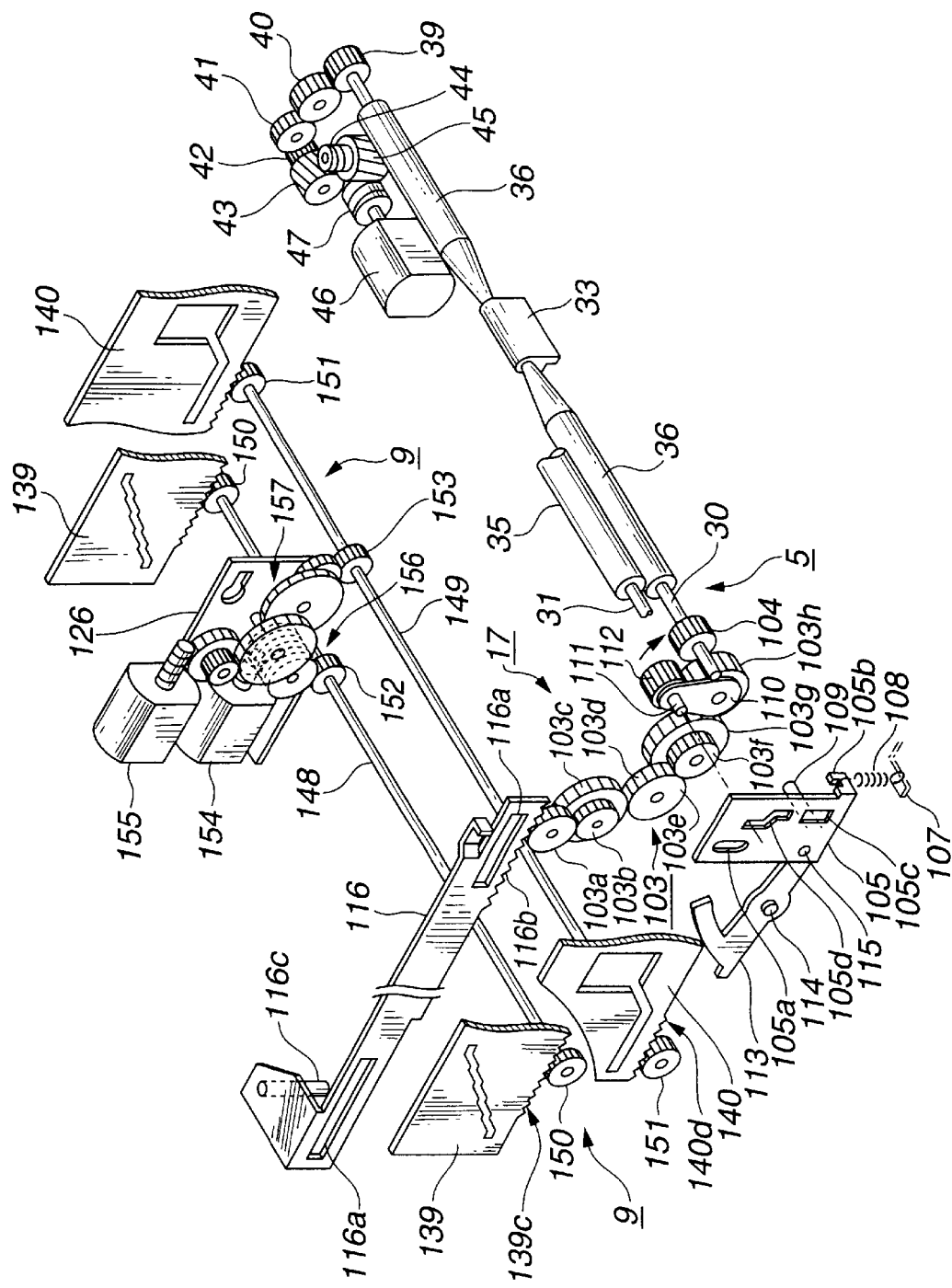

Means for driving said driving shaft 30 is described. As shown in FIG. 6, a gear 39 is fixed on the right end of the driving shaft 30, and a gear 40, a gear 41, and gears 42 and 43 formed into one body are supported so as to freely rotate inside the right side plate 1c. A worm 44 engaged with the gear 43 and a gear 45 are rotatably supported as one body on the bottom plate 1e, and the gear 45 is engaged with a worm 47 fixed on the output shaft of a transfer motor 46 mounted on the bottom plate 1e.

In order to automatically perform an operation of further pushing in a CD by a few millimeters more after insertion of the CD by the rollers 35 and 36 has finished, a pushing-in means 48 is provided as shown in FIGS. 2 and 5. Three pairs of guide slots 49, 50 and 51 each being in the shape of a long slot are formed along the horizontal direction respectively above and below the insertion/ejection opening 4 in the front face plate 1a.

A pair of slide stands 52 are provided on the right and left parts of the back of the front face plate 1a, and three guide pins 53, 54 and 55 fixed on each slide stand 52 are inserted into said guide slots 49, 50 and 51 so that they cannot be pulled out.

A vertical roller 57 made of resin is rotatably supported through a vertical shaft 56 at the back part of each of the slide stands 52. In order to push the pair of slide stands 52 toward each other, a pushing-in spring 60 is provided between a spring engaging portion 58 formed on the front face plate 1a and a spring engaging portion 59 formed on each slide stand 52.

A CD being at a height position where the vertical roller 57 is disposed is horizontally positioned by the vertical roller 57, but a CD below or above the vertical roller 57 is positioned by positioning rods 61 and 62 stood on the bottom plate 1e as shown in FIG. 5 and a pair of unshown positioning rods attached to the ceiling plate 1d to hang from it (which are arranged on the extension lines of the positioning rods 61 and 62, and a space which a CD to be inserted or ejected passes through is formed between the positioning rods 61 and 62).

(E) Opening/closing Means

An opening/closing means 6 for opening/closing the insertion/ejection opening 4 of the front face plate 1a is described. As shown in FIG. 2, a shutter 64 is provided so as to freely move up and down at the front side of the front face plate 1a. An opening 64a for making a CD pass through it is formed in the shutter 64, and when the shutter 64 rises, the middle height position of the opening 64a occupies the boundary position between the rollers 35 and 36 to bring an "opened" state, and when the 'shutter falls, a "closed" state is brought.

That is to say, a pair of upper and lower guide pins 65 are stood at each of the right and left parts of the front face plate 1a, while a pair of vertically long guide slots 64b are formed at each of the right and left parts of the shutter 64 and a stop ring is fitted onto the fore end of each guide pin 65 inserted through into each guide slot 64b.

In order to enable the interval between the pair of slide stands 52 to become large only when the shutter rises to be "opened", said pair of guide pins 54 near the center are made longer than the other guide pins 53 and 55, and L-shaped guide slots 64c for inserting the guide pins 54 into them are formed in the shutter 64.

In order to make the shutter 64 forcibly rise to be "opened" when the interval between the pair of vertical rollers 57 is expanded and a CD is forcibly ejected for some reason, a guide rail portion 64d is formed on the upper face of this guide slot 64c.

Next, a link mechanism for opening and closing the shutter 64 is described. Guide slots 66a being long in the right and left directions are formed in the front face and underside of a lateral (right and left) slide plate 66 being nearly L-shaped in cross section, while guide pins 67 inserted into said guide slots 66a are fixed on the front face plate 1a and the bottom plate 1e.

Figure 17:
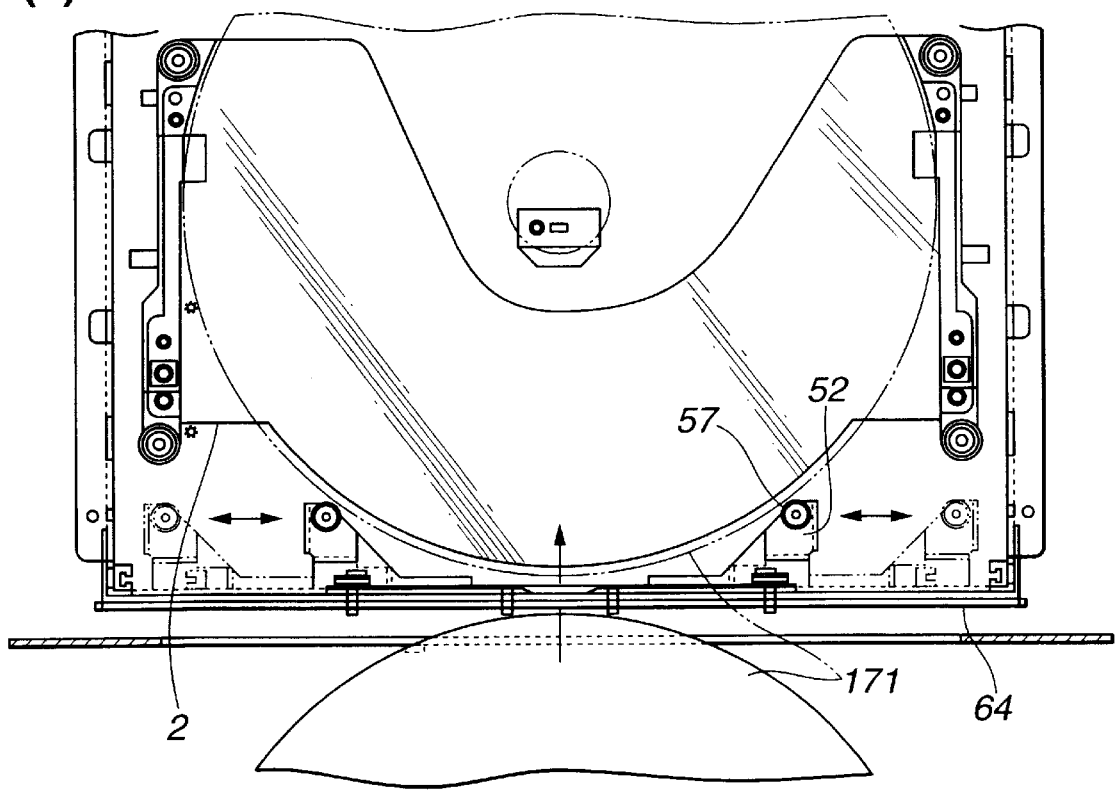
FIG. 17 shows the disc player at the time of inserting a CD, and figure (a) thereof is a plan view of it and figure (b) thereof is a front view.
Figure 17:
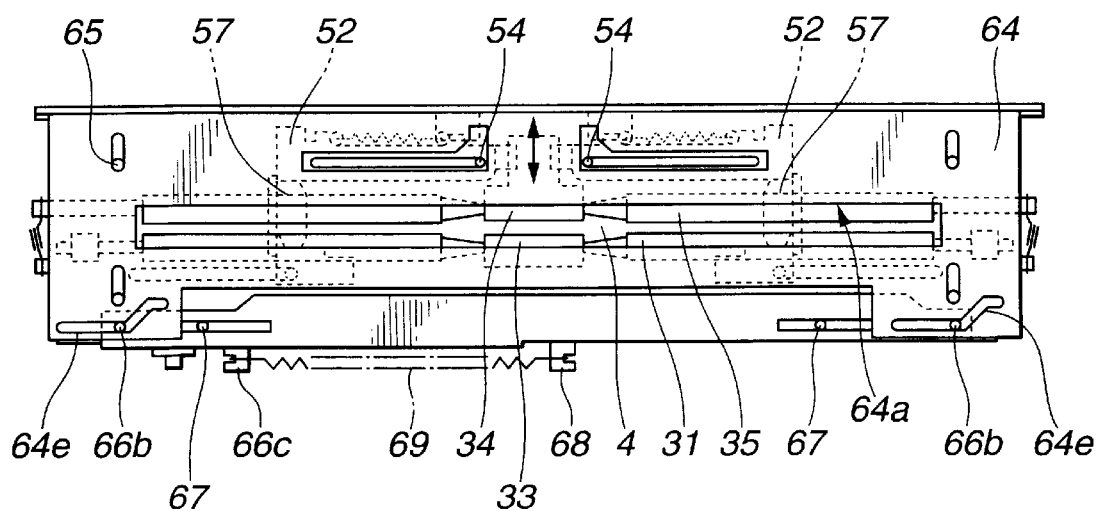

A cam slot 64e is formed in the lower part at each side of the shutter 64, while a slide pin 66b is fixed on each end part at the front face of the lateral slide plate 66 and the slide pin 66b is inserted into the cam slot 64e. Spring engaging portions 66c and 68 projecting downward as shown in FIG. 17(b) are formed respectively on the underside of the lateral slide plate 66 and on the underside of the bottom plate 1e, and a return spring 69 is engaged between both of them.

A longitudinal slide plate 70 is provided on the left underside of the bottom plate 1e so as to freely slide in the longitudinal (forward and backward) directions. That is to say, a pair of guide slots 70a are formed in the longitudinal slide plate 70, while an unshown gib-headed pin inserted into the guide slot 70a is fixed on the bottom plate 1e.

A bent portion of a nearly L-shaped lever 72 is rotatably attached to the underside of the bottom plate 1e through a fixed shaft 73 as shown in FIG. 5, and slots 72a and 72a are formed at the end parts of the lever 72. And pins 66d and 70b respectively fixed to the lateral slide plate 66 and the longitudinal slide plate 70 are slidably fitted into the slots 72a and 72a. A pressed portion 70c to be pressed by an outer slider 140 described later is formed in the longitudinal slide plate 70.

(F) Reproducing Means

A reproducing means 7 is arranged closely to the back of the disc storing portion 3 in order to make the disc player as small in depth as possible. Since a holding means 14 in the reproducing means 7 is mounted on the pickup elevator 10 as shown in FIG. 2, the pickup elevator 10 is first described.

The pickup elevator 10 is made by forming a horizontal plate and vertical plates at both sides of it into one body, and a cut-out portion 10a being in the shape of a circular arc is formed to allow a CD to come in at the front side of the horizontal plate. A pair of horizontally projecting pins 77 for lifting and lowering the pickup elevator 10 are fixed on each of the vertical plates. The pair of pins 77 are arranged at the same height and are made shorter than the pair of pins 22b of said disc elevator 22. These pins 77 are inserted through into a pair of vertical slits 78 formed in each of the side plates 1b and 1c of the case 1 to project outside the case 1.

(F-1) Space Forming Means

As shown in FIG. 2, as a space forming means 11 for forming space over and under a selected CD by being inserted between trays 2 vertically stacked one over another, separating cams 82 made of resin are provided so as to freely slide in the longitudinal directions inside the vertical plates of both sides of the pickup elevator 10.

Figure 3:
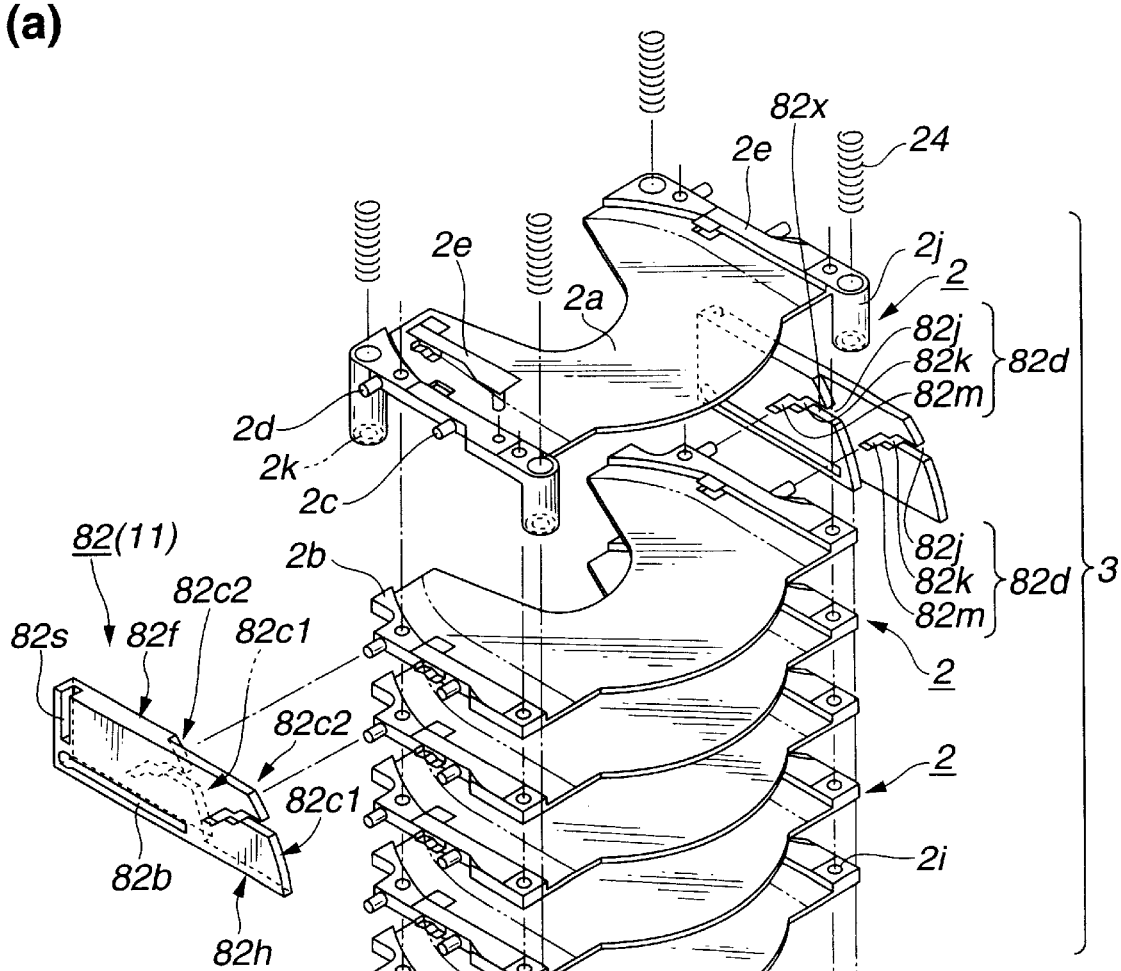
FIG. 3 shows an embodiment of the present invention, and figure (a) thereof is an exploded perspective view of a disc storing portion of the disc player, and figure (b) thereof is a partially cutaway perspective view of a main part of trays.
Figure 3:
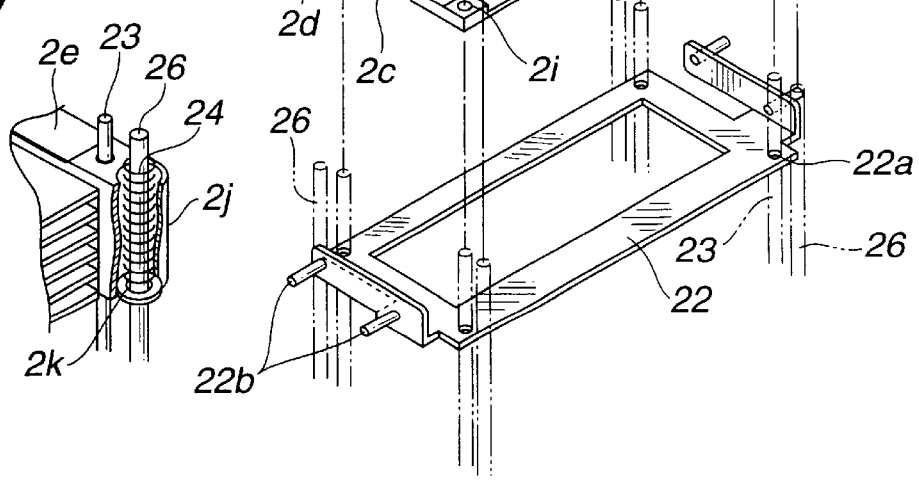

That is to say, a guide slot 10a is formed in the forward upper part of the vertical plate of the pickup elevator 10 and a gib-headed guide pin 82a inserted into the guide slot 10a is fixed on the separating cam 82, while a guide slot 82b is formed in the lower part of the separating cam 82 as shown in FIG. 3 and a gib-headed guide pin lob of FIG. 2 inserted into the guide slot 82b is fixed at an intermediate position in the longitudinal directions of the vertical plate.

The separating cams 82 are inserted toward said tray 2 and stably carry the tray 2 by pushing up four pins 2c and 2d at both sides of the tray 2 and form space over and under the tray 2 carrying a CD to be reproduced.

The separating cams 82 each are formed in such a shape that two plates different in length in the longitudinal directions, said plates each having a slit formed in it, are adhered to each other, and are composed so as to make the separating cams 82 slide into both sides of a tray 2 and thereby make the forward parts move up a pair of longer pins 2c and the backward parts move up a pair of shorter pins 2d.

That is to say, they are composed as follows. A pair of first separation control portions 82c1, 82c1 are formed in order to move up a selected tray 2 carrying a selected CD and trays 2 above this selected tray 2, and a pair of second separation control portions 82c2, 82c2 for moving up only the trays 2 above the selected tray 2 are formed above the first separation control portions 82c1.

And third separation control portions 82d, 82d for holding only the selected tray 2 are formed respectively between the first separation control portions 82c1 and the second separation control portions 82c2. An upper face 82f for holding the positions of the pins 2c and 2d of the tray 2 over the selected tray 2 and a lower face 82h as a position control means for holding the positions of the pins 2c and 2d of the tray 2 under the selected tray 2 and pressing the receiving portion 2g of the plate spring 2e are formed along the direction of movement of the separating cam 82.

Figure 21:
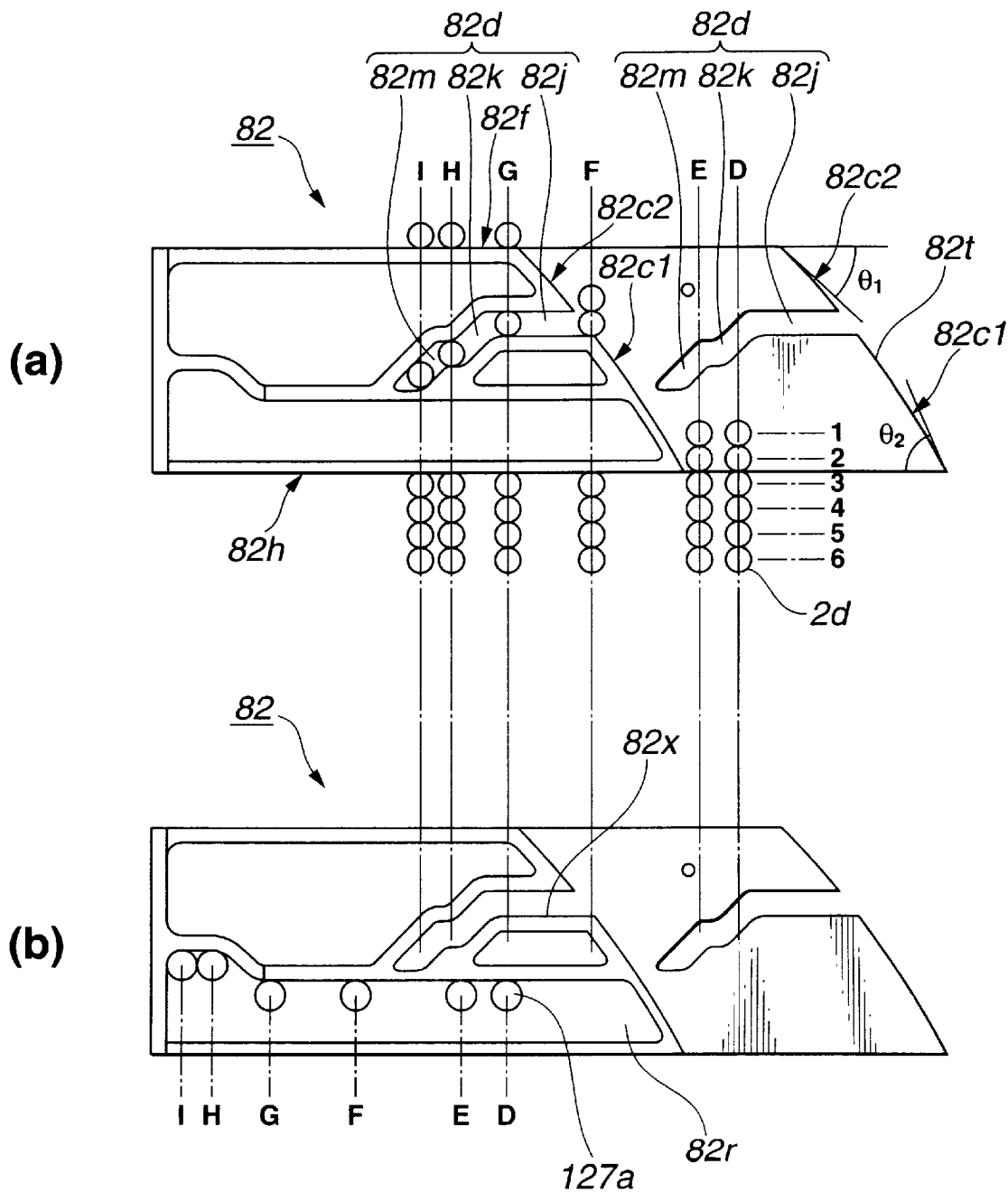
FIG. 21 shows operation of a separating cam, and figure (a) thereof is an operation explaining diagram showing the relation to movement of trays, and figure (b) thereof is an operation explaining diagram showing the relation to a pin.

Since the pins 2c and 2d of the selected tray 2 and the tray 2 over the selected tray 2 are pushed up by the advance of the first and second separation control portions 82c1 and 82c2, they are originally set at a fixed value such as $\theta=45°$ or the like, for example. In this case, however, the trays 2 are lifted as compressing the coil springs 24, and the higher the trays 2 are lifted, the more greatly the coil springs 24 are compressed and the load applied when pushing up the trays 2 becomes larger. In other words, the load is small at the initial stage of compressing the coil springs 24. As shown in FIG. 21(a), therefore, the upper parts of the first and second separation control portions 82c1 and 82c2 take $\theta1=45°$ for example, while the lower parts take $\theta2=60°$ for example, and the intermediate parts between both of them are formed by arc-shaped faces 82t.

Next, the third separation control portions 82d, 82d are described. The third separation control portions 82d, 82d are composed of upper stage entering portions 82j, 82j, intermediate stage entering portions 82k, 82k and lower stage entering portions 82m, 82m. The upper stage entering portions 82j, 82j are used for forming space over and under a selected tray 2, the intermediate stage entering portions 82k, 82k are used for lowering the selected tray 2 and a selected CD and placing the selected CD on a turntable 97 of a lower arm 13, and the lower stage entering portions 82m, 82m are used for lowering again only the selected tray 2 and separating the selected tray 2 from the selected CD.

(F-2) Holding Means

A holding means 14, which is turned toward the space formed over and under a selected CD by the space forming means 11 and holds the selected CD, is described. The base end portions of the lower arm 13 and an upper arm 12 are turnably attached to the left part of the pickup elevator 10. That is to say, they are made as follows.

Figure 8:
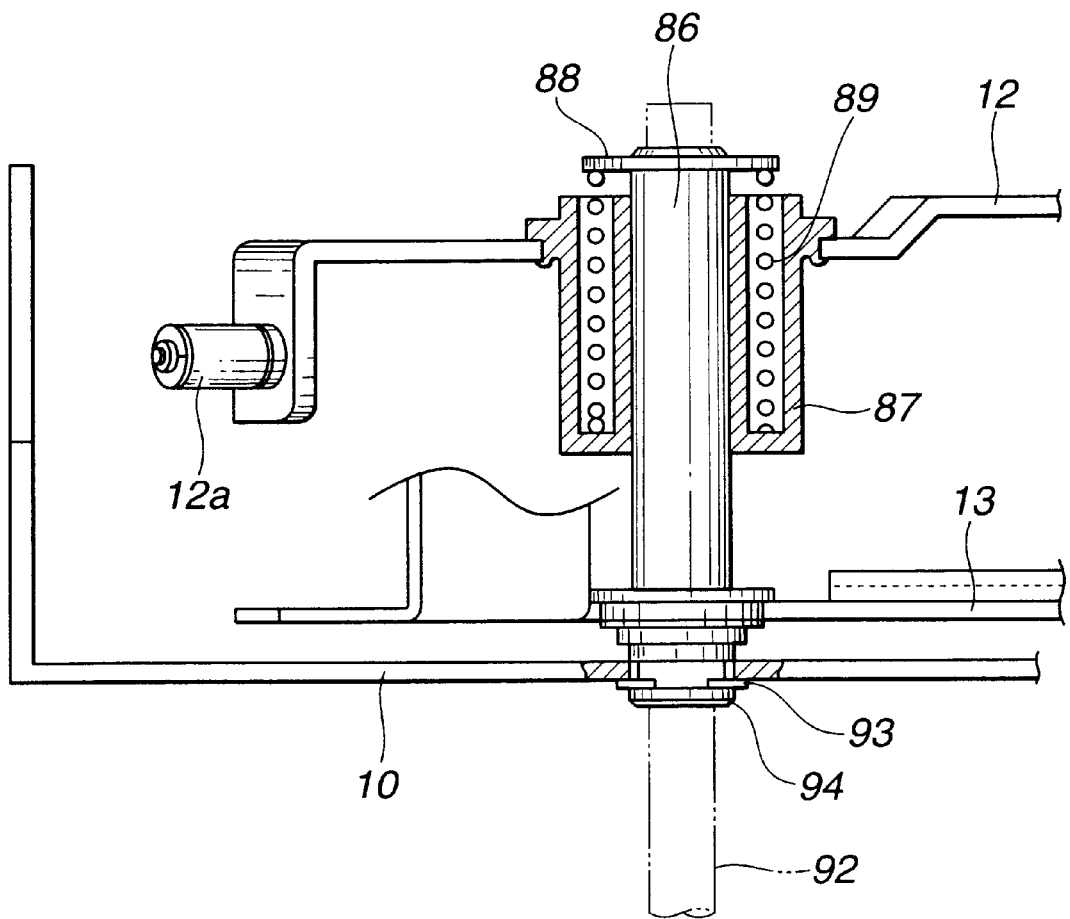
FIG. 8 is a sectional view of a main part of a holding means.

As shown in FIG. 8, the vicinity of the lower end of a hollow shaft 86 is fixed on the lower arm 13, and the lower end of this hollow shaft 86 penetrates the pickup elevator 10 so as to freely turn and has a flat washer 93 and a stop ring 94 attached to it for preventing it from slipping out. And a sleeve 87 made of a copper alloy penetrates and is fixed to the base end portion of the upper arm 12, and a selected CD is held between the lower arm 13 and the upper arm 12 descending in parallel with the lower arm 13 by keeping the hollow shaft 86 inserted through into the sleeve 87.

The upper end portion of the hollow shaft 86 penetrates a flat washer 88 and has a stop ring attached to it and, a holding spring 89 for pressing downward the upper arm 12 is provided between the flat washer 88 and the sleeve 87.

Figure 7:
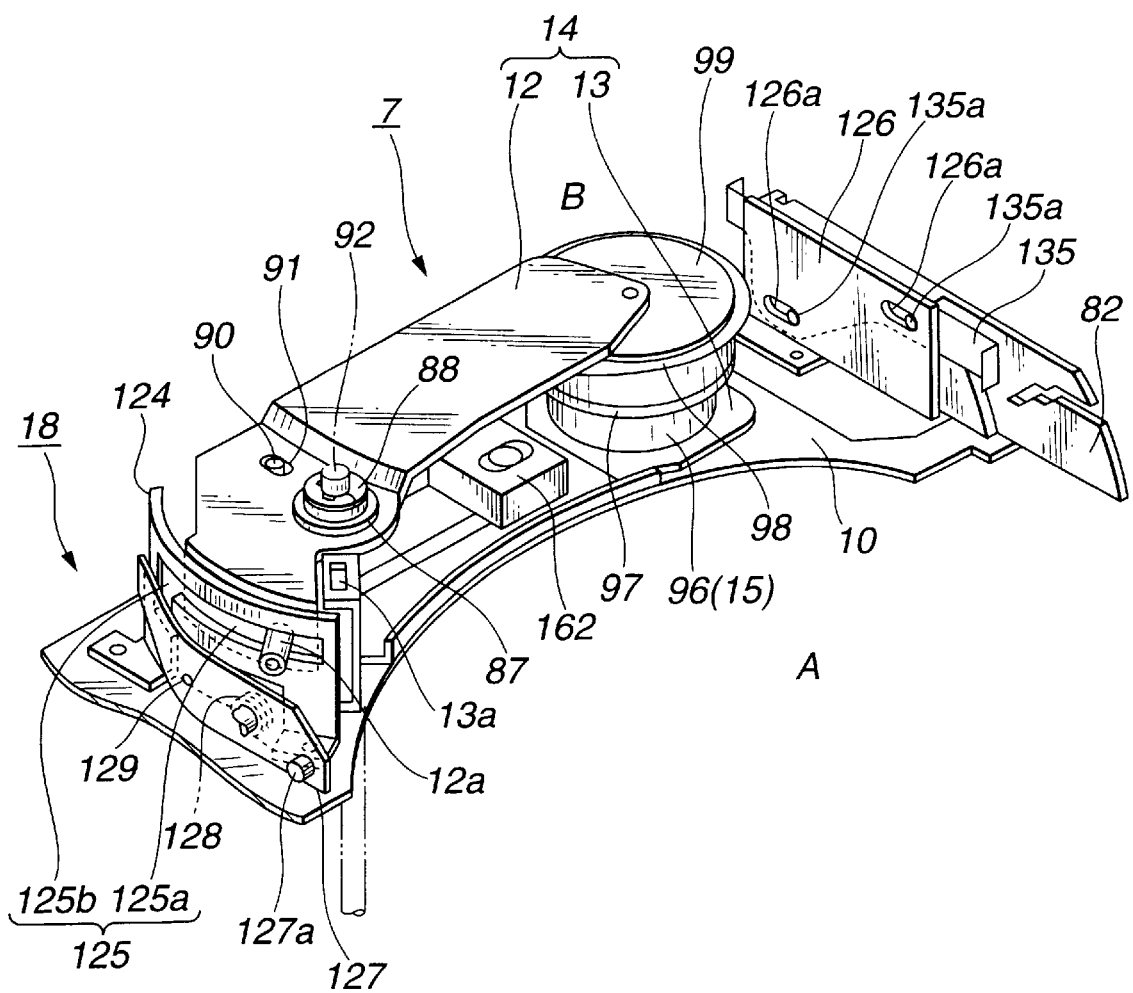
FIG. 7 is a perspective view of a reproducing means.

And a sliding pin 90 stood on the lower arm 13 as shown in FIG. 7 is slidably inserted through into a slot 91 formed in the upper arm 12 so that the lower arm 13 and the upper arm 12 are turned around the hollow shaft 86 synchronously with each other as one body without turning relative to each other. In order to improve the accuracy of positioning a turntable 97 described later on the lower arm 13 and a CD when the holding means 14 is turned, a supporting pole 92 stood on the bottom plate 1e is inserted through into the hollow shaft 86 on the pickup elevator 10.

(F-3) Disc Driving Means

Figure 34:
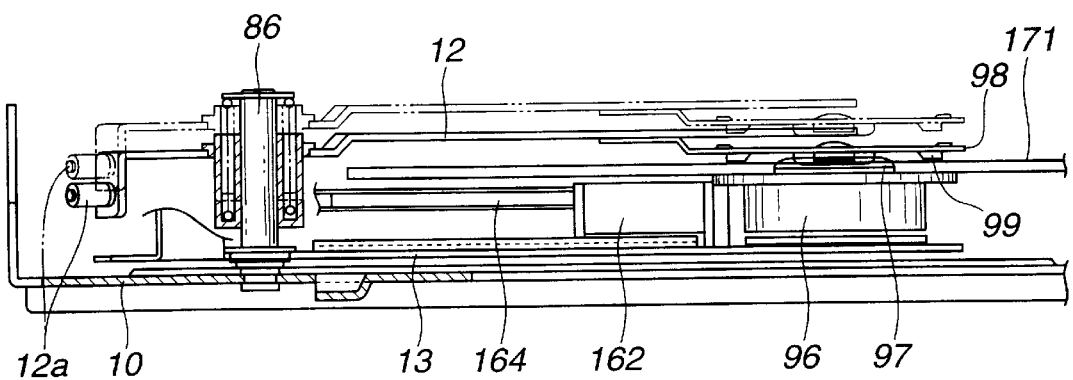
FIG. 34 is an operation explaining diagram showing a state where the holding means holds a CD due to cancellation of the hindrance by the regulation means.

A disc driving means 15 is provided on the upper face of the fore end portion of the lower arm 13. That is to say, a spindle motor 96 is mounted as shown in FIG. 7, and a turntable 97 to be fitted into the central hole of a CD is mounted on the output shaft of the spindle motor 96. On the other hand, one end of a supporting plate 98 is fixed to the vicinity of the fore end of the upper arm 12 as shown in FIG. 34, and the other end portion has a circular hole formed in it.

And a chuck plate 99 made of resin and having a ridge-shaped convex portion formed along a circle on the underside of a disc is freely turnably fitted into the hole from above. This chuck plate 99 is prevented from slipping out by one end of an unshown spring plate fixed at the other end of it on the underside of the upper arm 12.

(F-4) Pickup Unit

Figure 9:
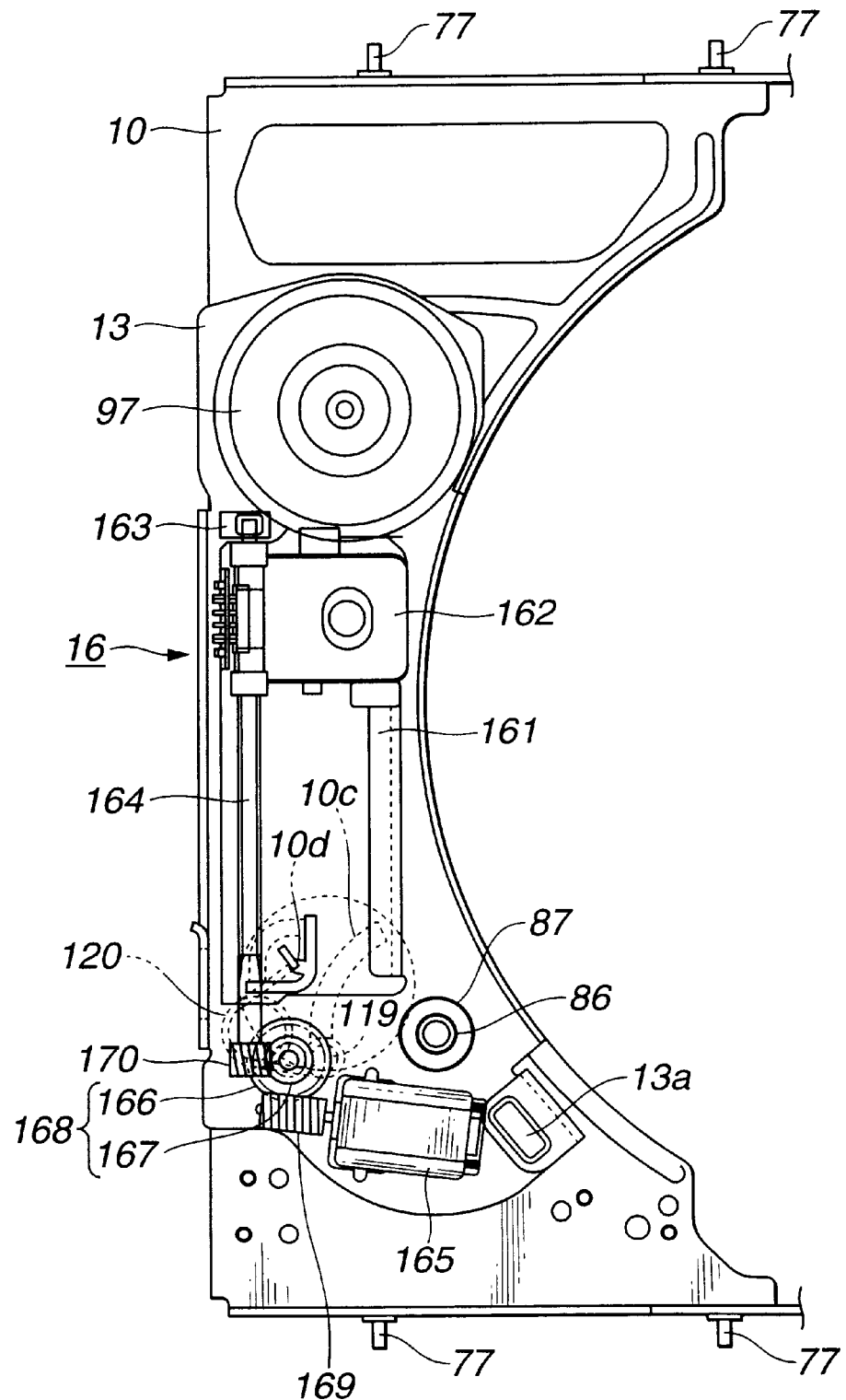
FIG. 9 is a plan view of a pickup unit.

A pickup unit 16 is also mounted on the upper face of the lower arm 13 as shown in FIG. 9. The composition of the pickup unit 16 is described in the following. An optical pickup 162 is provided so as to freely move along the direction of length of the lower arm 13 through a guide rail 161 formed into one body with the lower arm 13. And a means for making the optical pickup 162 reciprocate along the guide rail 161 is provided.

A screw shaft 164 is turnably supported on the upper face of the lower arm 13 through a pair of bearing members 163, and an unshown internal thread portion of the optical pickup 162 is screwed onto the screw shaft. The output shaft of a scanning motor 165 fixed near said sleeve 87 is geared to this screw shaft 164.

That is to say, a gear 168 having a worm wheel 166 and a screw gear 167 formed into one body is freely turnably supported, and a worm 169 of the output shaft is engaged with the worm wheel 166, while a screw gear 170 attached to the screw shaft 164 is engaged with the screw gear 167.

(F-5) Turning Force Supplying Means

The composition of a turning force supplying means 17 for turning the holding means 14 with the driving force of said transfer motor 46 is described in the following. A gear train 103 is provided inside the left side plate 1b of the case 1 as shown in FIG. 6. That is, the gear train 103 is composed of gears 103a to 103h.

Figure 28:
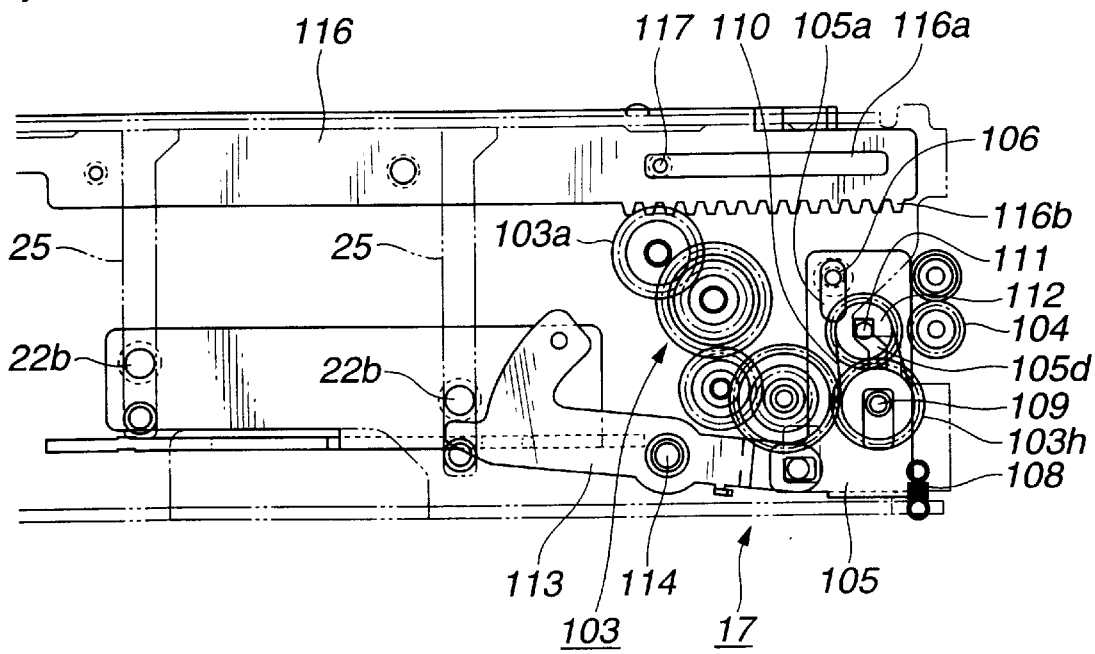
FIG. 28 shows a turning force supplying means, and figure (a) thereof is an operation explaining diagram showing a state where a turning force is not supplied, and figure (b) thereof is an operation explaining diagram showing a state where a turning force is supplied.
Figure 28:
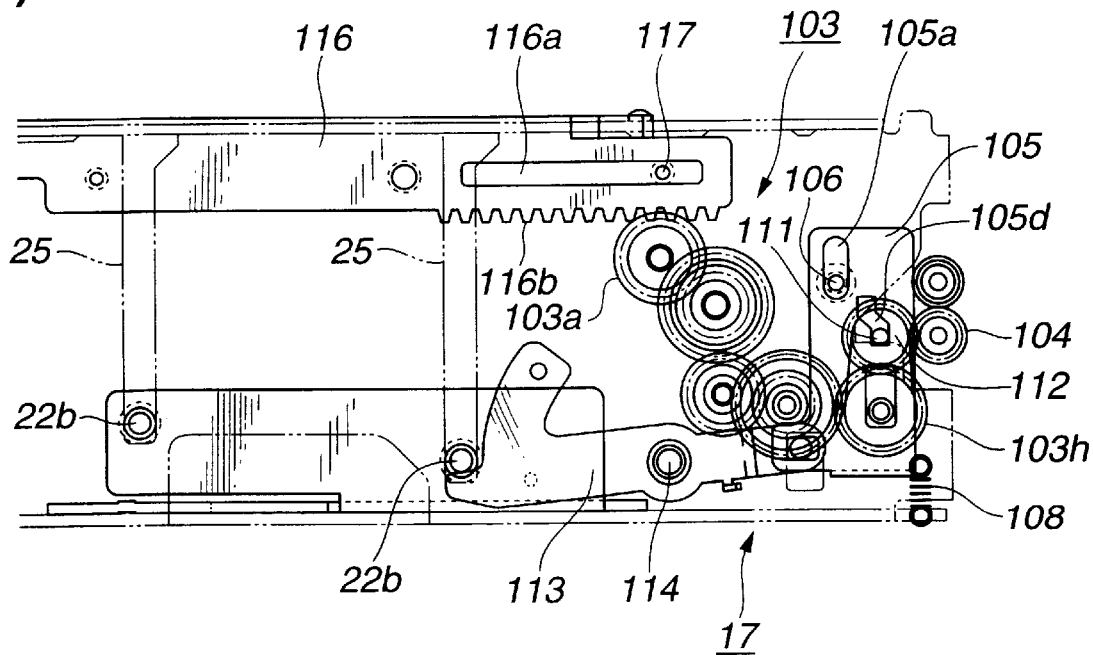

On the other hand, a gear 104 is also fixed on the left end of said driving shaft 30. A plate 105 is provided so as to freely move in the vertical directions inside the left side plate 1b. That is, a vertically long guide slot 105a is formed in the upper part of the plate 105, and a guide pin 106 (see FIG. 28) inserted through into the guide slot 105a is fixed on the left side plate 1b and a stop ring is attached to the guide pin 106.

Spring engaging portions 105b and 107 are respectively provided on the lower parts of the plate 105 and the bottom plate 1e of the case 1, and a return spring 108 for pulling down the plate 105 is provided between both of them.

A relief hole 105c, into which a shaft 109 (fixed on the side plate 1b) of said gear 103h is inserted, is formed in the plate 105, and the base end portion of a lever 110 is turnably attached to the shaft 109. A moving shaft 111 penetrating the lever 110 is fixed on the fore end portion of this lever 110, and a gear 112 engaged with the gear 103h is turnably attached to the moving shaft 111.

A cam slot 105d is formed above the relief hole 105c in the plate 105, and a penetrating end portion of the moving shaft 111 is inserted through into the cam slot 105d. That is, when the plate 105 is moved up, the cam slot 105d is moved up and the moving shaft 111 inserted in the cam slot 105d is moved forward and thereby the gear 112 attached to the moving shaft 111 comes to be engaged with a gear 104 of the driving shaft 30.

In order to move up this plate 105, a middle portion of a lever 113 is turnably supported on the inside of the left side plate 1b through a pin 114, and one end of the lever 113 is turnably coupled to the lower portion of the plate 105 through a pin 115.

The other end of the lever 113 faces the lower part of the forward guide slot of a pair of guide slots 25 of the left side plate 1b, said guide slot having a pin 22b of the disc elevator 22 inserted into it. That is, when the disc elevator 22 comes to the lowest position to be in a reproducing mode, the pin 22b presses down the other end of the lever 113 to engage the gear 112 with the gear 104.

Next, the highest gear 103a of the gear train 103 and the lower arm 13 of the holding means 14 are geared to each other as described in the following. As shown in FIG. 2, a slide bar 116 composed of a vertical portion being long in the longitudinal directions and a horizontal portion being formed into one body with the vertical portion in the back part of the vertical portion is provided as shown in FIG. 2.

A pair of guide slots 116a are formed near both ends of the vertical portion of the slide bar 116, and as shown in FIG. 5, a pair of guide pins 117 inserted into the pair of guide slots 116a are fixed on the inside of the left side plate 1b and have stop rings attached to them. In such a way, a rack 116b is formed on the forward underside of the slide bar 116 capable of freely sliding in the longitudinal directions and is engaged with said gear 103a, while the upper end of an engaging pin 116c projecting downward is fixed to the end portion of the backward horizontal portion.

This engaging pin 116c is slidably fitted into a slot 13a of a horizontal portion which is formed as one body at the base end portion of said lower arm 13 and extends to the height of the upper arm 12. This slot 13a is formed long along a radial line which passes the axis of the sleeve 87 and is perpendicular to the sleeve 87.

Figure 30:
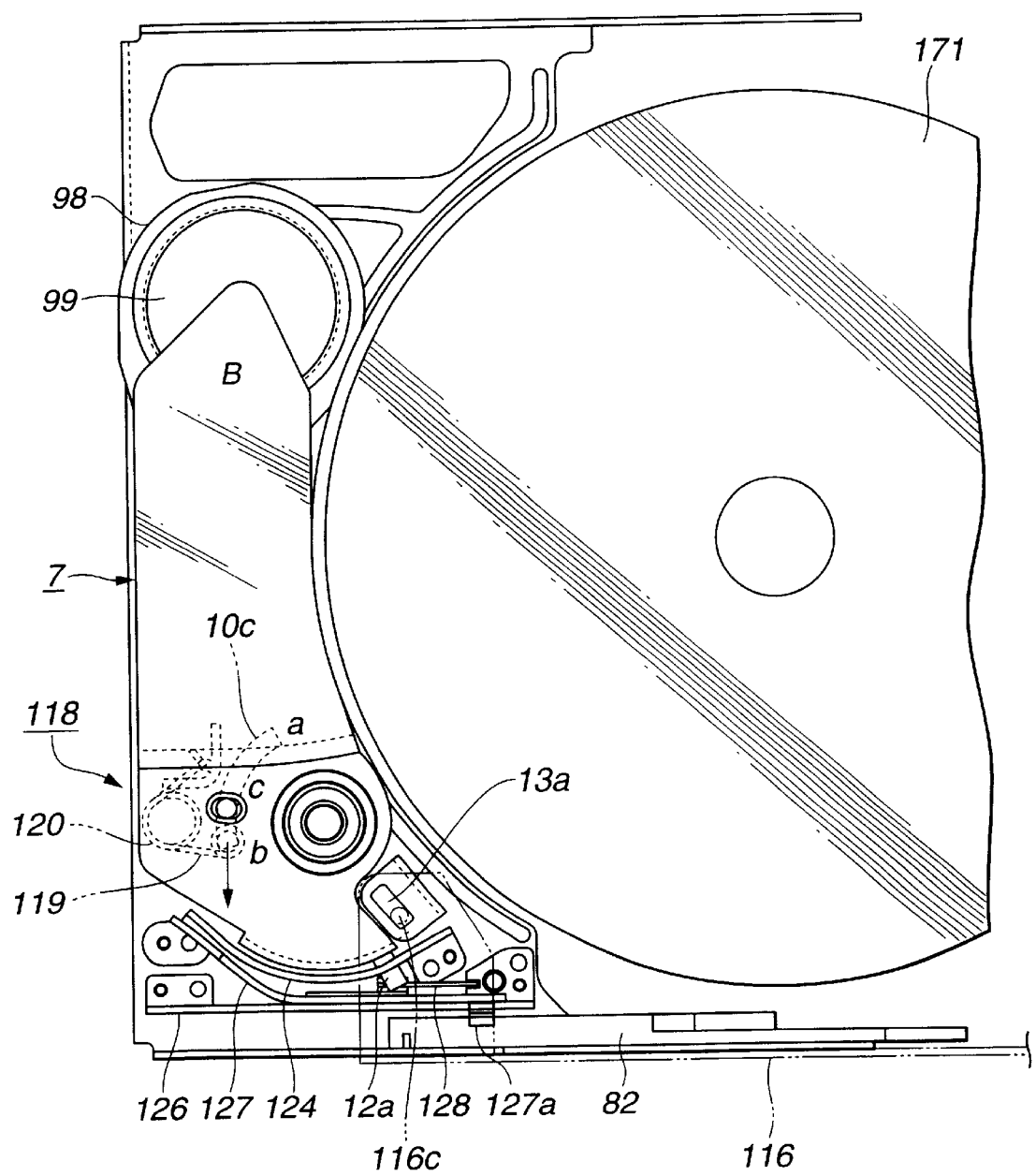
FIG. 30 is an operation explaining diagram showing a state where the holding means occupies the standby position.
Figure 31:
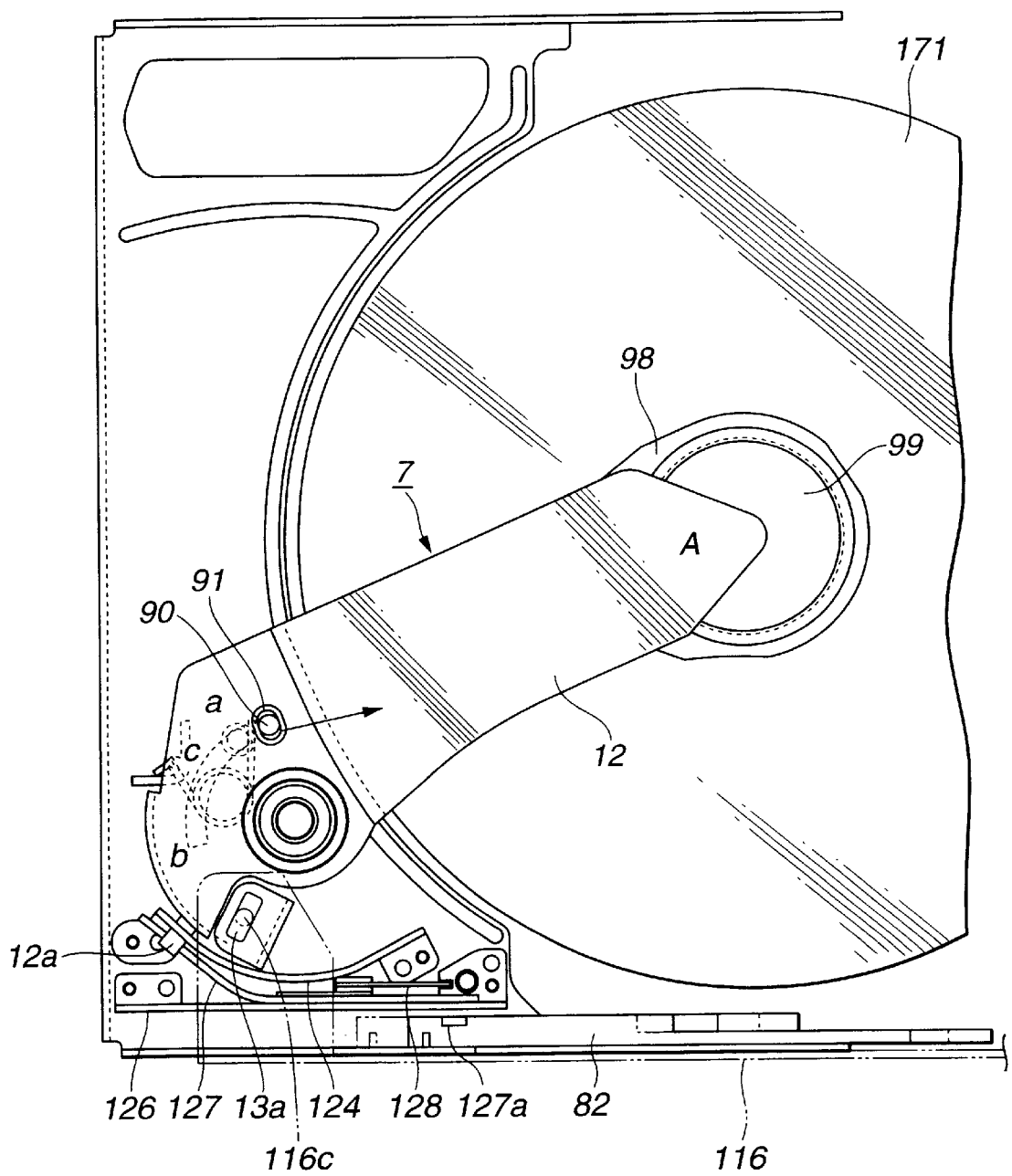
FIG. 31 is an operation explaining diagram showing a state where the holding means occupies the reproducing position.

The disc player has two operation modes including an insertion/ejection mode for inserting or ejecting a CD into or from the disc storing portion 3 and a reproducing mode for reproducing a CD, and the holding means 14 occupies position B as shown in FIG. 30 in the former mode and occupies position A as shown in FIG. 31 in the latter mode.

Figure 10:
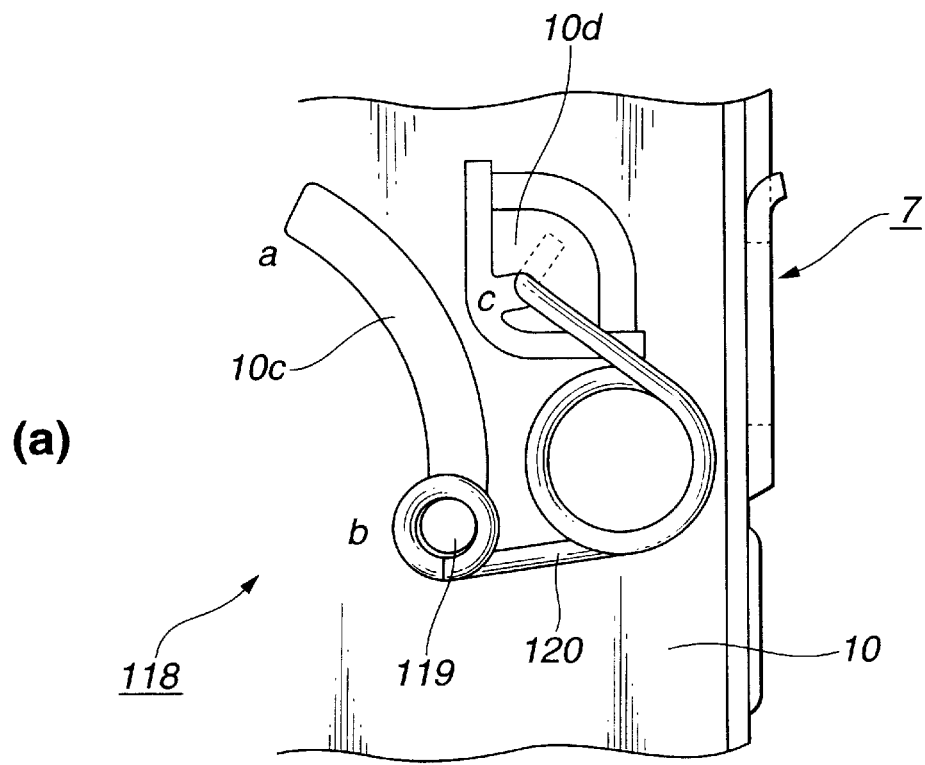
FIG. 10 shows a positioning means, and figure (a) thereof is a back view in case that the holding means is positioned at the standby position and figure (b) thereof is a back view in case that the holding means is positioned at the reproducing position.
Figure 10:
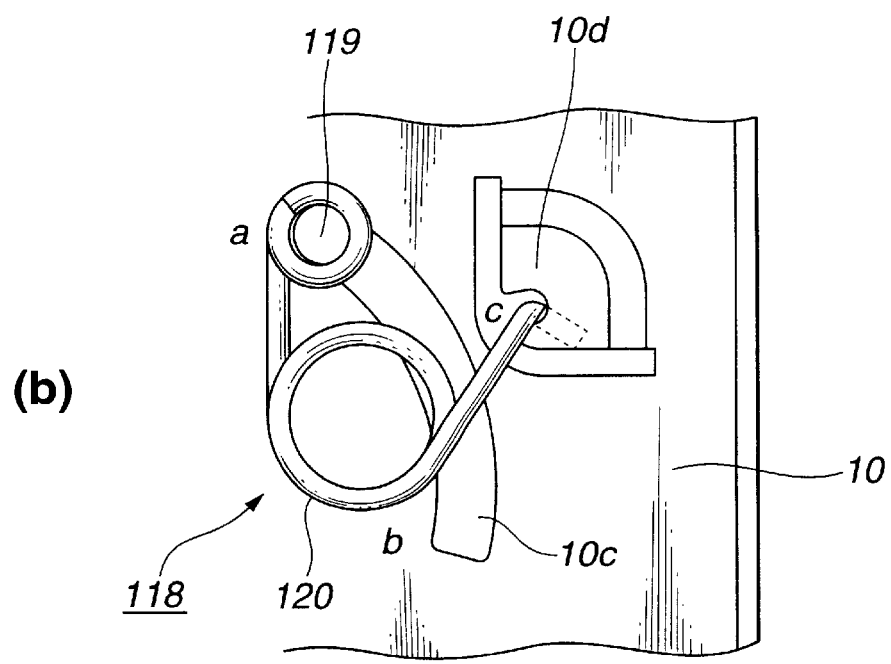

The turning operation of the holding means 14 between position B and position A is performed through the turning force supplying means 17 as described above. CD Since it is necessary to accurately position a selected CD and the turntable 97 on the lower arm 13, however, a positioning means 118 of FIG. 10 is provided.

The structure of the positioning means 118 is described in the following. As shown in FIGS. 9 and 10, the upper end of a positioning pin 119 projecting downward is fixed on the lower arm 13 near the hollow shaft 86. On the other hand, a circular-arc slot 10c is formed in a part of the pickup elevator 10 corresponding to a range in which the positioning pin 119 moves when the holding means 14 is turned, and the positioning pin 119 is slidably fitted into the circular-arc slot 10c.

A spring engaging portion 10d projecting downward is formed on the pickup elevator 10, and both ends of a toggle spring 120 are engaged with the spring engaging portion 10d and the positioning pin 119. Assuming that a position occupied by the positioning pin 119 when the holding means 14 occupies position B or A is position b or a, position c being a middle point between b and a is an inflection point at which the direction of movement of the positioning pin 119 and said spring engaging portion 10d is arranged at a position corresponding to position c.

(F-6) Regulation Means

The upper arm 12 of said holding means 14 is pressed downward by said holding spring 89, and a regulation means 18 for setting the time when the upper arm is to be lowered by the pressing force of this holding spring 89 is provided as shown in FIG. 7. That is to say, this is composed as follows.

Figure 32:
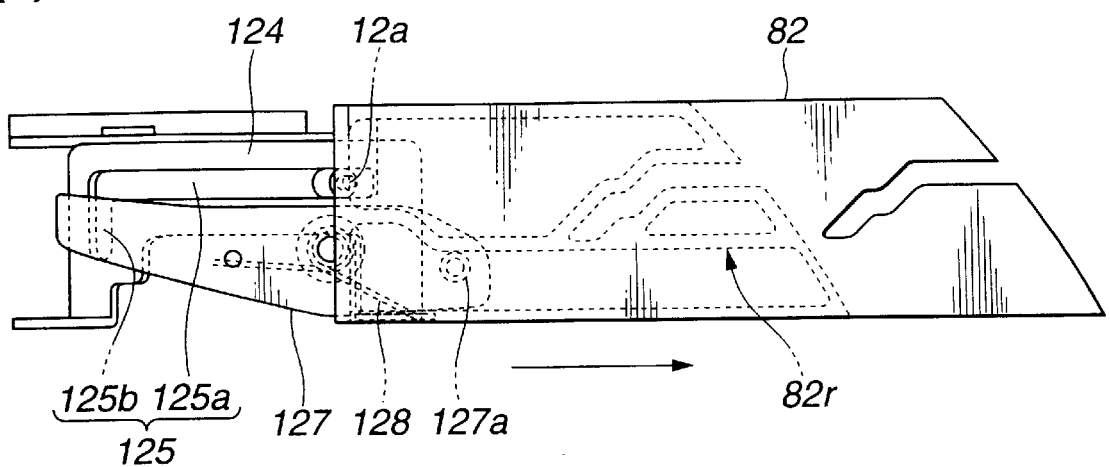
FIG. 32 shows a state of a regulation means when the holding means occupies the standby position, and figure (a) is an operation explaining diagram of it and figure (b) is a main part explaining diagram.
Figure 32:
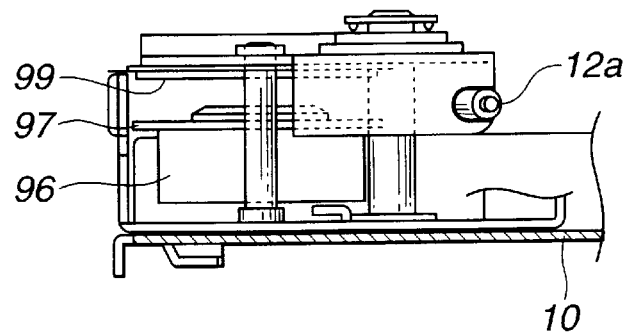
Figure 33:
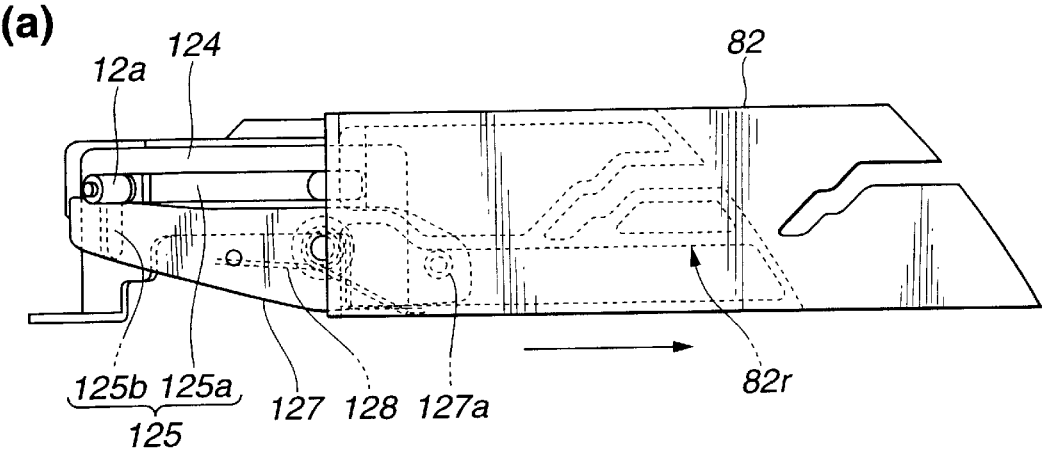
FIG. 33 shows the regulation means when the holding means occupies the reproducing position, and figure (a) thereof is an operation explaining diagram showing a state of hindering the holding, and figure (b) thereof is an operation explaining diagram showing a state of canceling the hindrance.
Figure 33:
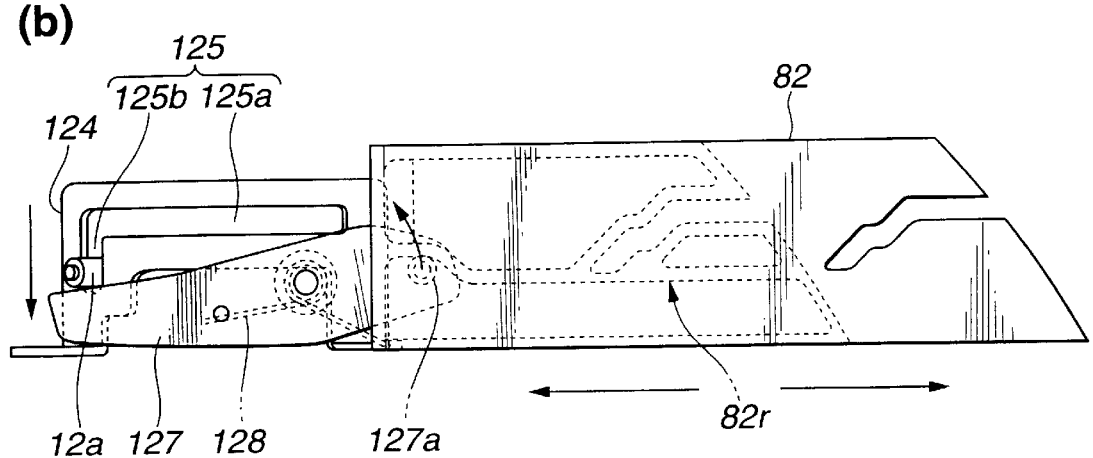

A cylindrical plate 124 is stood between said holding means 14 and said separating cam 82 on the upper face of the pickup elevator 10. This cylindrical plate 124 forms a partial cylinder being a part of a cylinder having the sleeve 87 as its center, and as shown in FIGS. 32 and 33, the cylindrical plate 124 has an L-shaped guide slot 125 formed in it, said slot being composed of a horizontal portion 125a being long in the circumferential direction and a vertical portion 125b long in the axial direction.

On the other hand, a guide pin 12a projecting outside in the direction of a radius having the sleeve 87 as its center is fixed on the base end portion of the upper arm 12, and the guide pin 12a is inserted in the guide slot 125.

Due to this, since the guide pin 12a is located on the horizontal portion 125a when the holding means 14 occupies position B being a standby position and while it moves from position B to a position just on this side of position A in FIG. 7, even if the upper arm 12 is pressed by a pressing force of the holding spring 89, it is not lowered and the holding means 14 is kept in the opened state. On the other hand, since the guide pin 12a is located in the vertical portion 125b when the holding means 14 comes to position B, the ax upper arm 12 is lowered by the pressing force of the holding spring 89 and the guide pin 12a also results in descending to the lower end of the vertical portion 125b.

In order to make the holding means 14 not immediately perform a holding operation even when the holding means 14 turns to position A of FIG. 7 and the guide pin 12a turns to the vertical portion 125b of the guide slot 125 but make the holding means 14 perform a holding operation at last when it is given a command, a first regulation means for temporarily regulating the downward movement of the guide pin 12a and a second regulation means for removing the regulation and making the holding means 14 hold a selected CD when after the regulation said separating cam 82 moves forward and then the selected CD and the selected tray 2 are lowered and placed on said turntable 97 are provided. That is to say, they are composed as follows.

As shown in FIGS. 7 and 30, a bearing plate 126 is stood in parallel with the separating cam 82 between said cylindrical plate 124 and said separating plate 82 on the upper face of said pickup elevator 10. A middle portion of a restriction lever 127 is turnably supported on the inside of the bearing plate 126 through a turning shaft 129 as shown in FIG. 7, and a pin 127a projecting outside is fixed on the forward part of the restriction lever 127, and the backward part of the restriction lever 127 is curved inside and faces the vertical portion 125b of the guide slot 125.

And a spring 128 for pressing downward the backward part of the restriction lever 127 is provided as shown in FIG. 30. On the other hand, the pin 127a of the forward part of the restriction lever 127 is loosely fitted into a cam groove 82r formed in the lower inside portion of the separating cam 82 as shown in FIG. 32. A relief portion is formed in the upper part at the back side of this cam groove 82r, and when the separating cam 82 moves forward and the pins 2c and 2d of the selected tray 2 enter the intermediate stage entering portions 82k and 82k, a state where the pin 127a can be relieved into the relief portion of the cam groove 82r is brought and the restriction lever 127 is turned by the spring 128 and the upper arm 12 is lowered by the pressing force of the holding spring 89.

(G) Pushing-out Means

Figure 19:
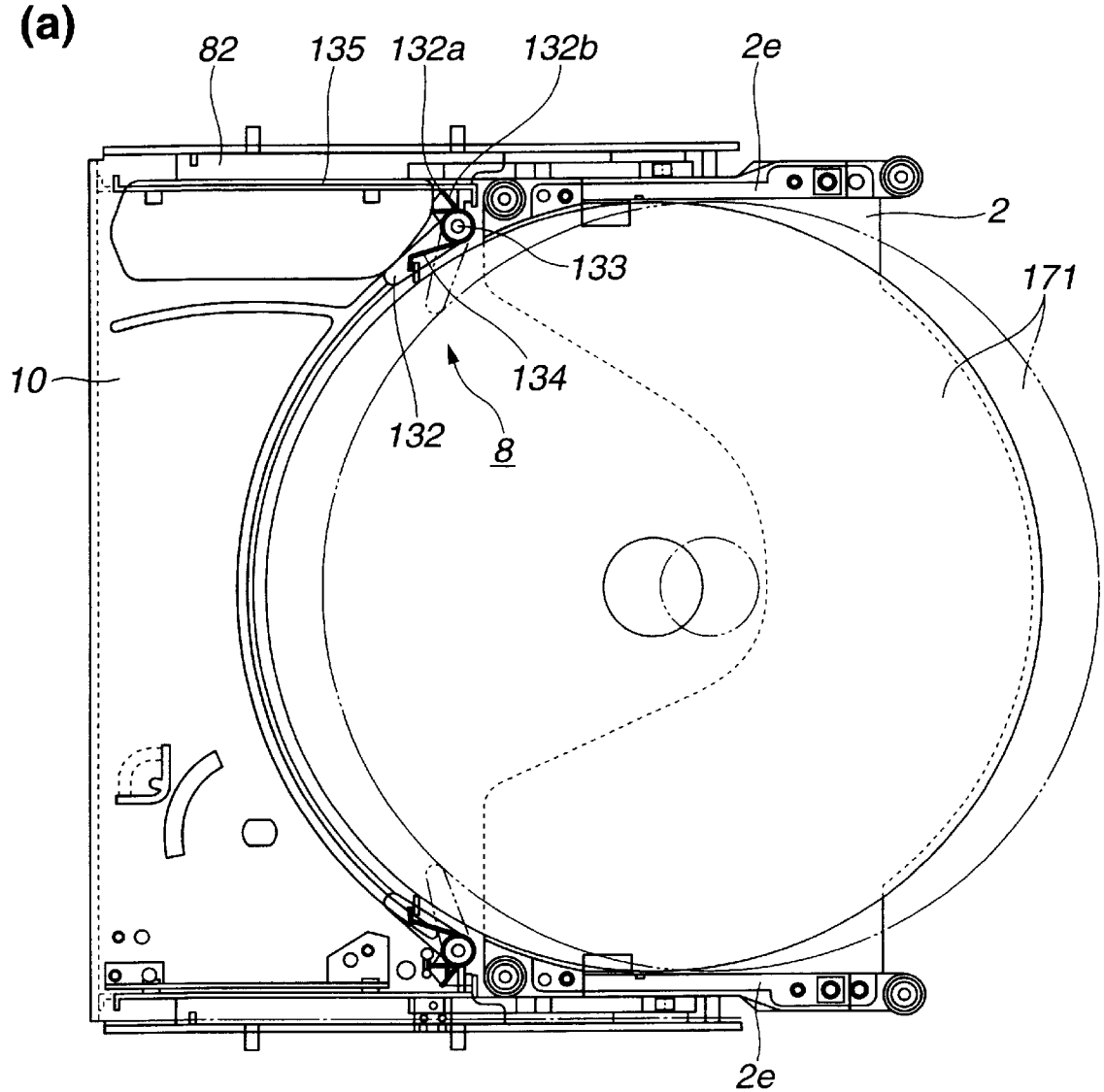
FIG. 19 shows a pushing-out means at the time of ejecting a CD, and figure (a) thereof is a plan view of it and figure (b) thereof is a front view.
Figure 19:
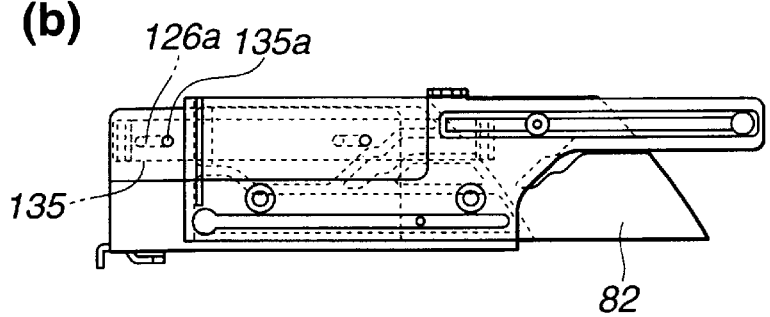

The pushing-out means 8 is provided at each of the right and left insides of the case 1. Since these parts of both sides are nearly the same in composition as each other, only one of them is described. As shown in FIGS. 1 and 19, a pushing-out lever 132 for pushing out a CD by its turning is turnably attached to a fixed shaft 133 projecting downward from the ceiling plate 1d of the case 1. The height of the pushing-out lever 132 is set at the same as the height between said rollers 35 and 36.

And both ends of a return spring 134 provided so as to surround the fixed shaft 133 are engaged with a spring engaging portion 132a formed on the pushing-out lever 132 and a spring engaging portion formed on the ceiling plate 1d.

On the other hand, this mechanism is composed so that the pushing-out lever 132 is turned by a backward movement of the separating cam 82 being opposite to the action of forming space by a forward movement of the separating cam 82 as described up to now. That is to say, the composition is as follows.

As shown in FIG. 7, a plate 135 is provided so as to freely slide forward and backward by a fixed distance outside said bearing plate 126. In other words, a pair of guide slots 126a are formed in the bearing plate 126, while a guide pin 135a inserted into each guide slot 126a is fixed on the plate 135. The front end portion of the plate 135 is bent inside so as to be engaged with a pressed portion 132b formed into one body with the pushing-out lever 132, and the back end portion of the plate 135 is bent outside to project toward the back of the separating cam 82.

(H) Operation Means

Finally, an operation means 9 is described. This operation means 9 lifts and lowers the disc elevator 22 to enable a CD on a tray 2 on each stage to be inserted and ejected and further opens said opening/closing means 6 and operates the pushing-out means 8 in the insertion/ejection mode, and lifts and lowers the pickup elevator 10 to select a CD to be reproduced, further operates the space forming means 11 and operates the regulation means 18 in a state where the disc elevator 22 is kept at the lowest position in the reproducing mode.

Figure 11:
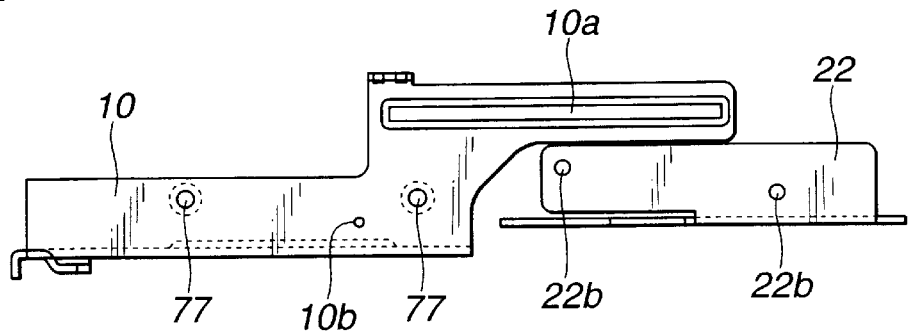
FIG. 11 shows an operation means, and figure (a) thereof is a front view of a pickup elevator and a disc elevator, and figure (b) thereof is a front view of an inner slider, and figure (c) thereof is a front view of an outer slider.
Figure 11:
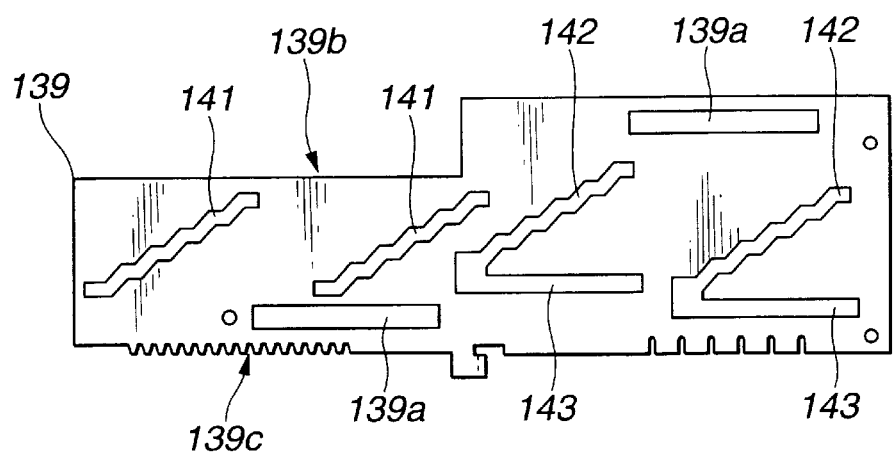
Figure 11:
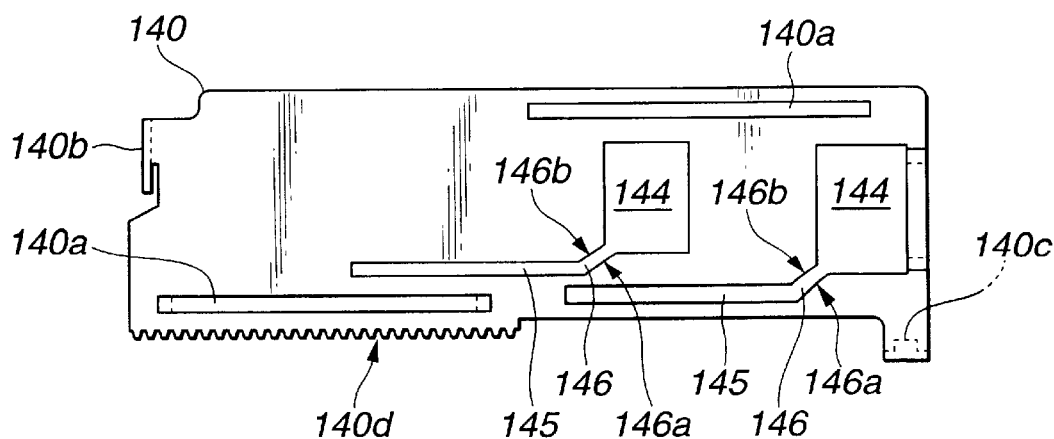

As shown in FIGS. 2 and 11, inner sliders 139 (first control plates) and outer sliders 140 (second control plates) are provided outside the left and right side plates 1b and 1c of the case 1 so as to freely slide forward and backward. Since they are respectively symmetrical to each other at the left and reight sides, one side of them is described. Guide slots 139a and 140a are formed in the upper and lower parts of the inner and outer sliders 139 and 140 respectively, and guide pins 158 and 159 fixed on the side plate are respectively inserted into both of the guide slots 139a and 140a, and have stop rings attached to them.

A pair of stepped slits 141 (position control portion) for stepping up a pair of pins 77 of the pickup elevator 10 at six steps, said pins 77 projecting from the vertical slits 78, are formed in the backward part of the inner slider 139. A pair of stepped slits 142 (position control portion) for stepping up a pair of pins 22b of the disc elevator 20 at six steps, said pins 22b projecting from the vertical slits 25, are formed in the forward part of the inner slider 139, and bottom slits 143 for keeping the disc elevator 22 at the lowest position and making only the pickup elevator 10 rise and fall in the reproducing mode are formed continuously with and under the stepped slits 142, respectively.

On the other hand, only slits, into which a pair of pins 22b being longer pins of the disc elevator 22 are inserted, are formed in the outer slider 140. That is to say, a pair of tetragon-shaped slits 144 used in the insertion/ejection mode for putting the pair of pins 22b into the stepped slits 142 and moving up and down them, a pair of horizontal line-shaped slits 145 used in the reproducing mode for putting the pins 22b into the bottom slits 143 and keeping them at the lowest position, and a pair of 45°-inclined changeover slits 146 (mode changeover portion) for changing over the positions of the pair of pins 22b between the pair of stepped slits 142 and the pair of bottom slits 143 by moving up or down the pins 22b by means of tapered faces 146a and 146b through sliding the outer slider 140 in either direction are respectively formed continuously with one another.

Since the reproducing mode slits 145 overlap each other to be continuous with each other if these slits 145 are formed at the same vertical position, the reproducing mode slits 145, the insertion/ejection mode slits 144, the bottom slits 143, the stepped slits 142 and the pins to be inserted into them are different in height from one another.

The upper back portion of the outer slider 140 is bent perpendicularly inside to form a projecting portion 140b. A relief cutout portion 139b and a relief slit 147 are formed respectively in the backward parts of the inner slider 139 and the side plate 1b so that this projecting portion 140b can be moved together with the outer slider 140.

In order to enable the separating cam 82 to slide together with the outer slider 140 regardless of the height position of the separating cam 82 moving up and down together with the pickup elevator 10, an engaging groove 82s is formed along the vertical direction in the outside face of the backward part of the separating cam 82 as shown in FIG. 2 and the projecting portion 140b is slidably fitted into said engaging groove 82s. And an engaging portion 140c is formed by bending the front portion of the left outer slider 140 toward under the bottom plate 1e of the case 1.

This engaging portion 140c presses backward said pressed portion 70c and opens the shutter 64 against the pressing force of the return spring 69 when the outer slider 140 slides backward.

Next, a driving mechanism for sliding said right and left inner sliders 139 and said right and left outer sliders 140 at the same time synchronously with each other is described. As shown in FIGS. 2 and 6, two coupling shafts 148 and 149 are rotatably supported through two pairs of bearings under the backward part of the bottom plate 1e of the case 1.

Pinions 150 and 151 are fixed respectively to both ends of the coupling shafts 148 and 149, and these pinions 150 and 151 are engaged respectively with racks 139c and 140d formed on the lower parts of the backward portions of the inner sliders 139 and outer sliders 140. Gears 152 and 153 are fixed respectively on the coupling shafts 148 and 149, and operation motors 154 and 155 are individually geared to these gears 152 and 153. That is to say, they are composed as follows.

The operation motors 155 and 154 are mounted at the upper and lower positions inside said bearing plate 126 arranged at the right side of the backward portion of the case 1, and the output shafts of these motors 155 and 154 are respectively geared to the gears 152 and 153 through two sets of reduction gear means 156 and 157 provided inside the bearing plate 126.

Next, operation of such a disc player is described.
(I) Whole Composition of the Operation The operation of the disc player is composed of three operations including the insertion of a CD into the disc storing portion 3, the ejection of a CD from the disc storing portion 3 and the reproducing of a CD which selects and reproduces one CD out of a plurality of CDs stored in the disc storing portion 3.

(J) Insertion of a CD

In case of inserting a CD into the disc storing portion 3, a number given to a tray 2 (numbers 1 to 6 are given to the trays 2 in order of height from the top to the bottom) is selected and an unshown number button, for example, button "2" is pressed and then an unshown insertion button is pressed.

The action that the rotation of the output shaft of the operation motor 154 is transferred to the reduction gear means 156 and the coupling shaft 148 and the pair of inner sliders 139 slide, and the action that the rotation of the output shaft of the operation motor 155 is transferred to the reduction gear means 157 and the coupling shaft 149 and the pair of outer sliders 140 slide are performed separately from and independently of each other.

Figure 12:
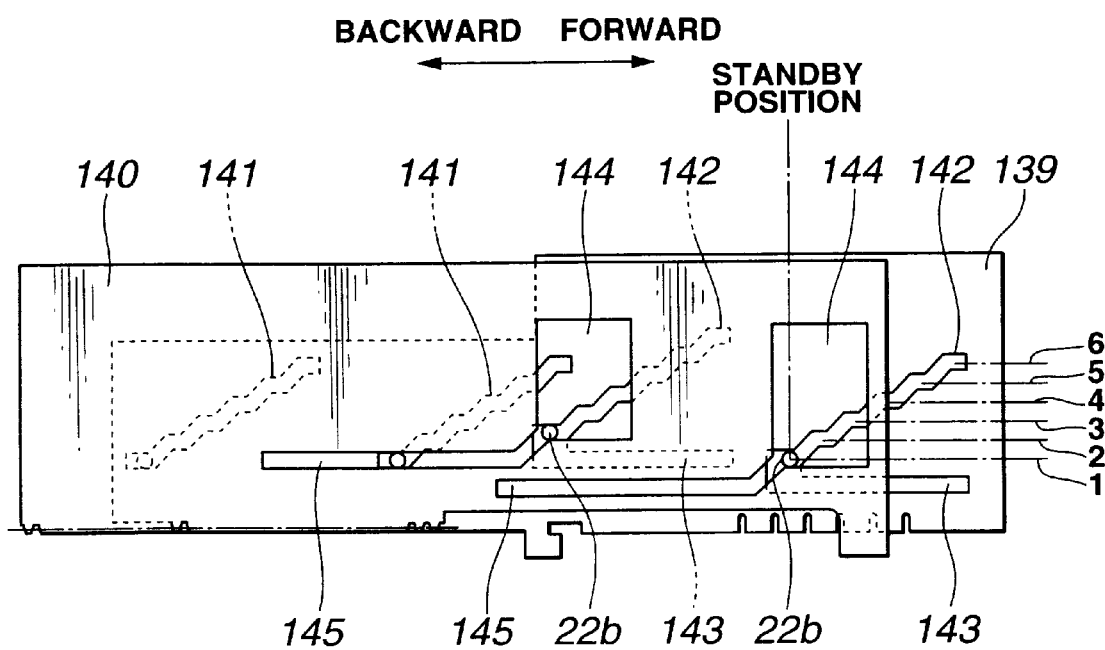
FIG. 12 is an operation explaining diagram of the operation means, showing a mode changeover position in the insertion/ejection mode for inserting or ejecting a CD.
Figure 13:
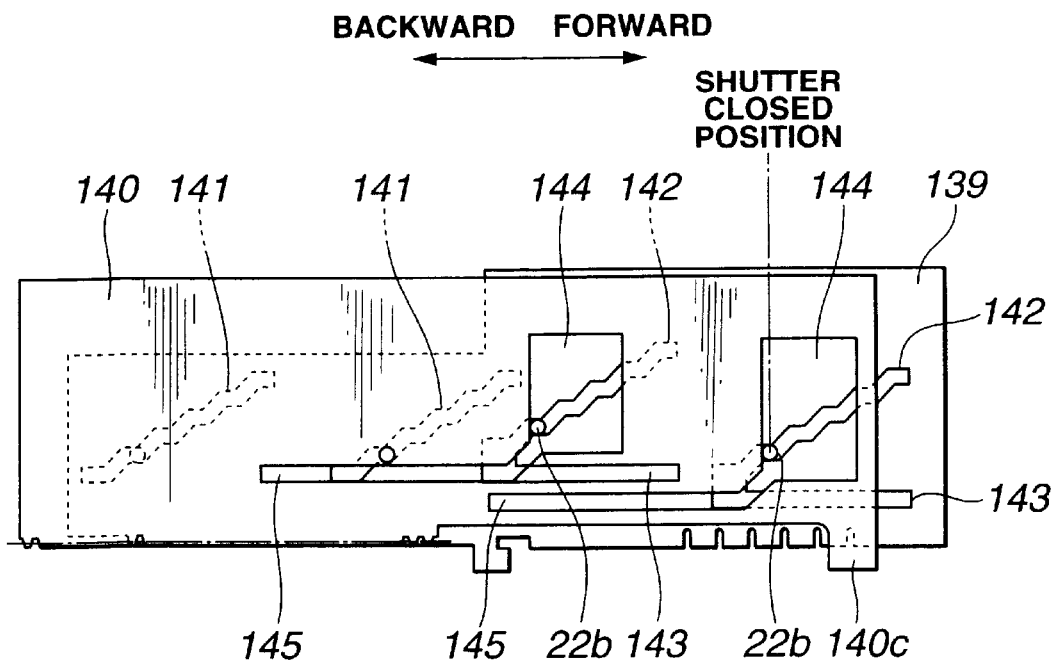
FIG. 13 shows a case of inserting or ejecting the second CD from the top, and figure (a) thereof is an operation explaining diagram of the operation means in the waiting state where the second CD is selected, and figure (b) thereof is an operation explaining diagram of the operation means in a state where a shutter is open.
Figure 13:
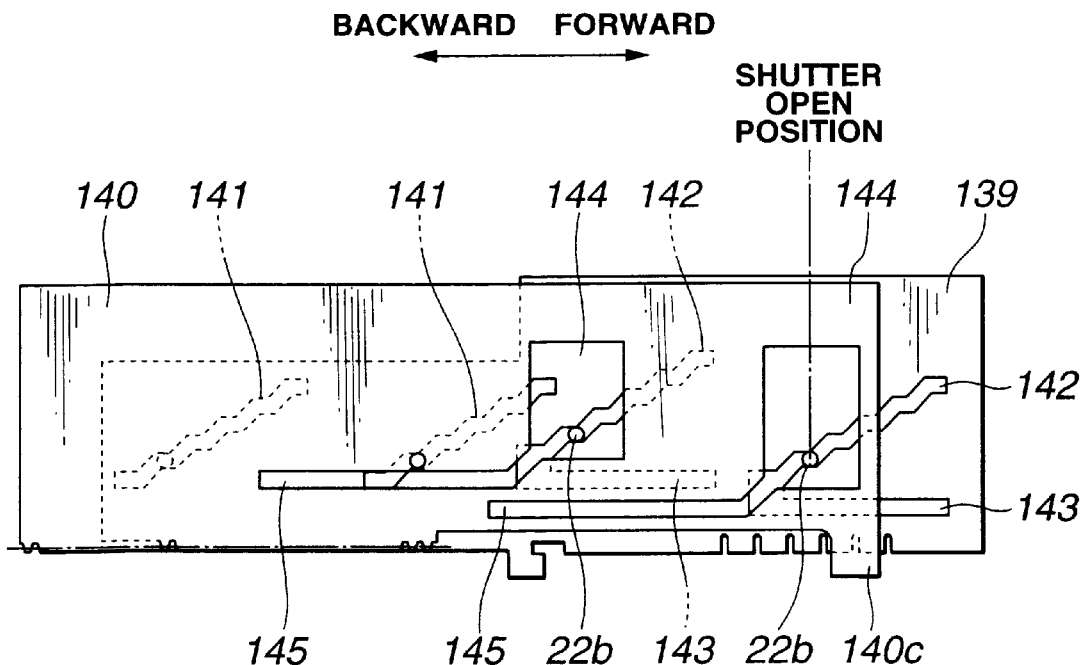

If a button is pressed when the pair of pins 22b enter the pair of insertion/ejection mode slits 144 of the outer slider 140 and for example as shown in FIG. 12 the pair of pins 22b are at the mode changeover position in the insertion/ejection mode, the inner slider 139 moves backward and thereby the pair of pins 22b each rise to the second step from the bottom of the stepped slit 142 as shown in FIG. 13(a), and simultaneously with this, the disc elevator 22 also rises and a CD on the second tray 2 from the top is set to the height of the pushing-out lever 132.

At this time the pickup elevator 10 also rises at the same time, but this action is an unnecessary action. When the inner slider 139 is moved further backward, the pickup elevator 10 rises together with the pins 22b and the third to sixth trays 2 come to the height of the pushing-out lever 132 in order.

Next, when the outer slider 140 moves backward until the pin 22b comes from the standby position of FIG. 13(a) to an intermediate position in the forward and backward directions of the insertion/ejection mode slit 144, since the engaging portion 140c of the outer slider 140 presses backward the pressed portion 70c shown in FIG. 2 under the bottom plate 1e, the movement of the longitudinal slide plate 70 is transferred to the lateral slide plate 66 through the lever 72 and the lateral slide plate 66 moves to the left against the pulling force of the return spring 69, and the shutter 64 rises and the insertion/ejection opening 4 is opened as shown in FIG. 17(b).

Since due to the above action the shutter 64 is opened and the second tray 2 from the top has already come to the same height as the pushing-out lever 132 as described above, when attempting to insert a CD 171 between the upper and lower rollers 35 and 36 as shown in FIG. 17(a), an unshown sensor arranged in the center on this side of the shutter 64 detects the CD 171 and the transfer motor 46 starts turning.

Figure 18:
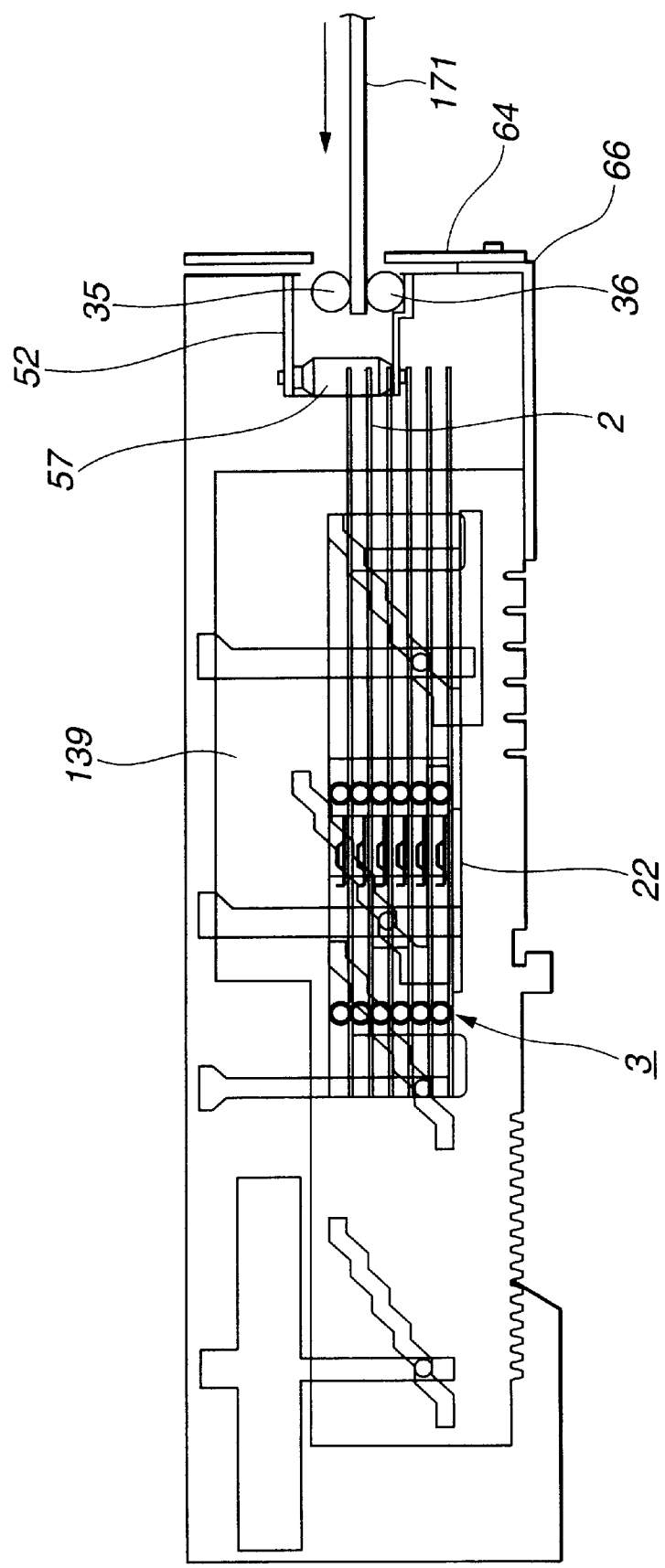
FIG. 18 is a sectional side view of the disc player at the time of inserting a CD.

Since the turning force of the transfer motor 46 is transferred to the roller 36 through the gears, the CD 171 is pulled in between the roller 36 and the roller 35 pressed to the roller 36 by the spring 38 as shown in FIG. 18 and the CD is inserted onto the second tray 2 by the rotation of the rollers 35 and 36, but since the CD 171 is only inserted just apart from the rollers 35 and 36 it is pushed in by several millimeters more by a pair of vertical rollers 57 pressed toward the center by the pushing-in springs 60.

The CD 171 is held on the tray 2 by holding portions 2f of the pair of plate springs 2e. When the CD 171 leaves the rollers 35 and 36, an unshown limit switch operates and the transfer motor 46 stops turning and at the same time the outer slider 140 moves forward and returns to the standby position of FIG. 13(a), and therefore the pressed portion 70 which has been pressed backward is released and the shutter 64 is closed by the action of the return spring 69.

In case that the pair of pins 22b occupies another height position (first or third to sixth from the bottom) of the stepped slits 142 also, a CD can be inserted by the same operation as described above.

(K) Ejection of a CD

In case of ejecting a CD from the disc storing portion 3, for example, number button "2" and the ejection button are pressed. Thereupon, in the same way as the insertion, the pin 22b moves for example from the changeover position in the insertion/ejection mode of FIG. 12 to the standby position of FIG. 13(a) and the CD on the second tray 2 from the top is set to the height of the pushing-out lever 132. And in the same way as described above, when the outer slider 140 moves backward until the pins 22b come to the position shown in FIG. 13(b), the shutter 64 is opened. The operation up to here is entirely the same as the operation of inserting a CD.

Figure 14:
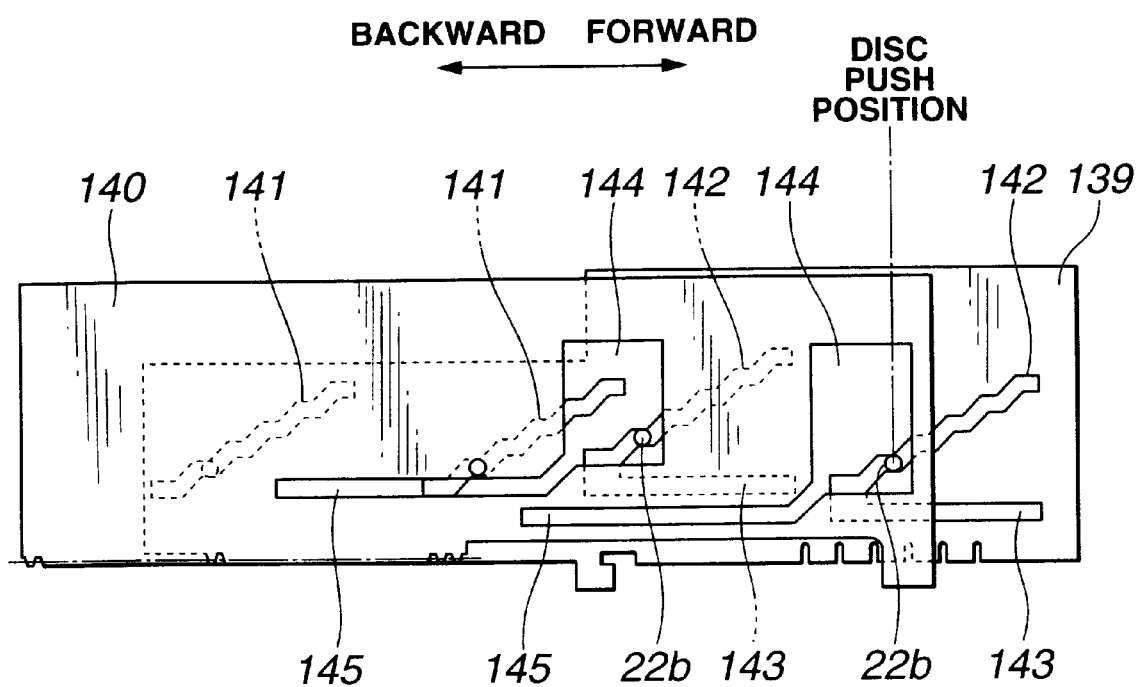
FIG. 14 is an operation explaining diagram of the operation means in a state where pushing-out levers are turned in case of ejecting the second CD from the top.

Next, when the outer slider 140 further moves backward until the pins 22b come to the forward parts of the insertion mode slits 144 as shown in FIG. 14, as shown in FIG. 19 the separating cam 82 geared to the outer slider 140 through the projecting portion 140b of the back portion of the outer slider 140 moves backward and the back of the separating cam 82 presses the back of the plate 135 to move backward.

Figure 20:
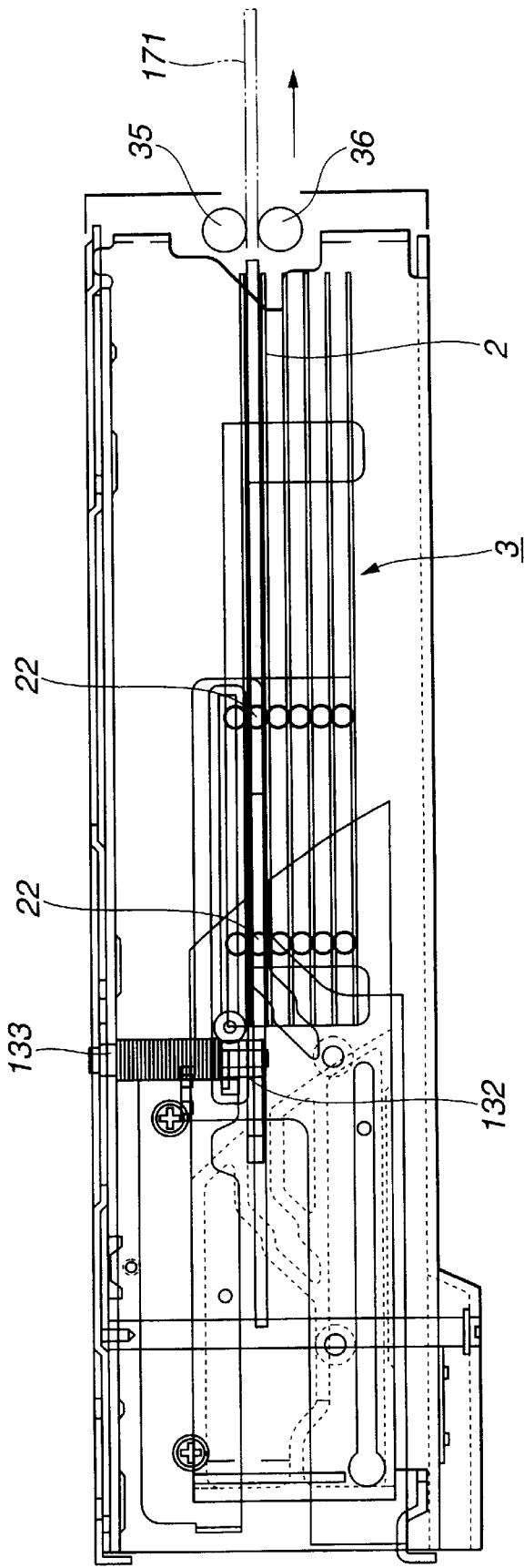
FIG. 20 is a sectional side view of the pushing-out means at the time of ejecting a CD.

Hereupon, the front portion of the plate 135 presses backward the pressed portion 132b of the pushing-out lever 132, and the pushing-out lever 132 is turned to push out each side of the second CD 171. Since the rollers 35 and 36 are already turning due to a fact that the transfer motor 46 is turned at the same time when the ejection button is pressed, the CD pushed out is inserted between the rollers 35 and 36 and ejected as shown in FIG. 20. In order to prevent the ejected CD 171 from falling, when a part of the backward portion of the CD 171 is between the rollers 35 and 36 an unshown limit switch detects this and the transfer motor stops turning. After this, the CD 171 results in being pulled out by hand from between the rollers 35 and 36.

When an unshown sensor detects that the CD 171 has been extracted, the outer slider 140 moves forward and the pins 22b return from the position of FIG. 14 to the standby position of FIG. 13(a).

Thereupon, since the backward force applied from the separating cam 82 to the plate 135 is removed, the pushing-out lever 132 is turned by the elastic force of the return spring 134 and returns to the original position shown by a solid line in FIG. 19(a), and subsequently the shutter 64 is closed in the same way as after the insertion of a CD.

In case that the pair of pins 22b occupies another height position (first or third to sixth from the bottom) of the stepped slits 142 also, a CD can be ejected by the same operation as described above.

(L) Reproducing of a CD

In order to reproduce a CD, a number button given the number of a CD to be reproduced, for example, button "2" and the reproducing button are pressed. Hereupon, the inner slider 139 moves forward from said state of FIG. 13(a) and thereby the pins 22b descend to the lowest position of the insertion/ejection mode slit 144 to come to the mode changeover position and thereafter the outer slider 140 moves forward.

Figure 15:
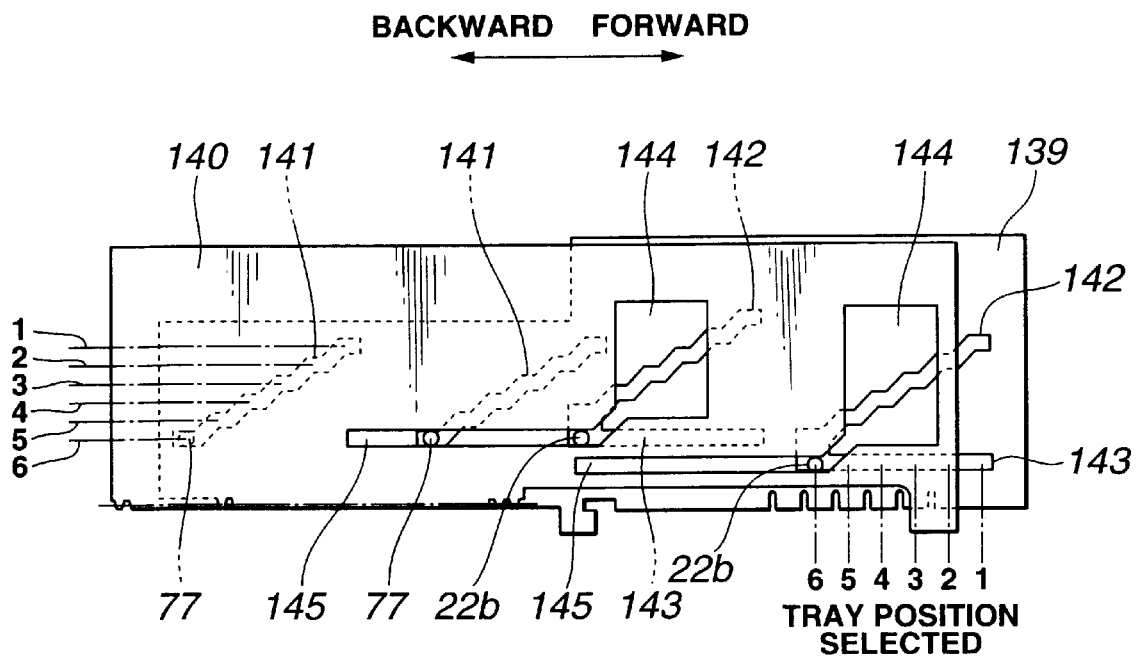
FIG. 15 shows the reproducing mode for reproducing a CD, and figure (a) thereof is an operation explaining diagram of the operation means in case of reproducing the sixth CD from the top, and figure (b) thereof is an operation explaining diagram of the operation means in case of reproducing the first CD from the top.
Figure 15:
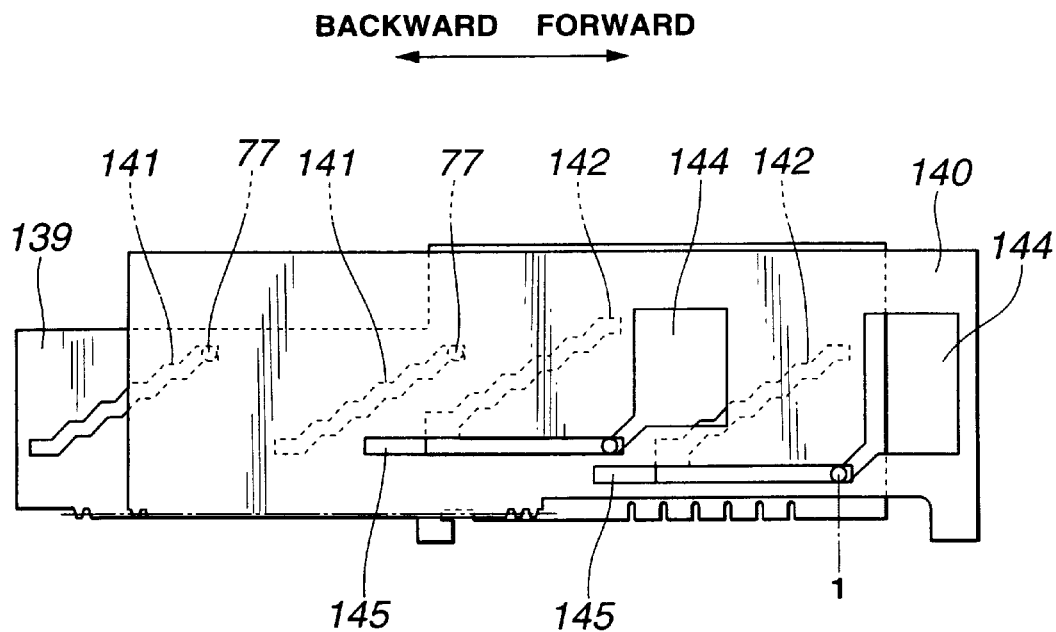

Hereupon, the pins 22b are lowered by pressing the upper tapered faces 146b of the changeover slits 146 (see FIG. 11(c)) and are moved into the bottom slits 143 and at the same time these pins 22b are moved into the reproducing mode slits 145 of the outer slider 140 and change over to the reproducing mode as shown in FIG. 15(a). During this changeover, the pair of pins 77 of the pickup elevator 10 stay at the lowest positions of the stepped slits 141.

The positions of the pins 22b at this time are the changeover positions in the reproducing mode to the insertion/ejection mode, and when the outer slider 140 is made to move backward from this state, the pins 22b are lifted by pressing the lower tapered faces 146a of the changeover slits 146 and can return to the changeover position in said insertion/ejection mode as shown in FIG. 12.

The positions of the pins 22b relative to the outer slider 140 shown in FIG. 15(a) are not only the mode changeover positions but also the CD selection positions for changing only the height of the pickup elevator 10 and selecting a CD to be reproduced.

In other words, when only the inner slider 139 is made to move backward from the position of FIG. 15(a), the pair of pins 22b seem to relatively move forward in the bottom slits 143 but are actually kept at the lowest positions of the vertical slits 25, and therefore the disc elevator 22 stays at the lowest reproducing position but the other pair of pins 77 hidden by the outer slider 140 not to be seen seem to relatively rise along the stepped slits 141 but actually rise along the vertical slits 78 by steps.

That is to say, when the pair of pins 22b are located at the positions corresponding to the numbers 1 to 6 given to the positions of the bottom slits 143 by making the inner slider 139 move backward, the pair of pins 77 rise or descend to the heights corresponding to the numbers 1 to 6 given in the vertical direction and a CD corresponding to the relevant number comes into a state where it can be reproduced. FIG. 15(a) is a state where a CD of number 6 can be reproduced, and FIG. 15(b) is a state where a CD of number 1 can be reproduced.

Figure 16:
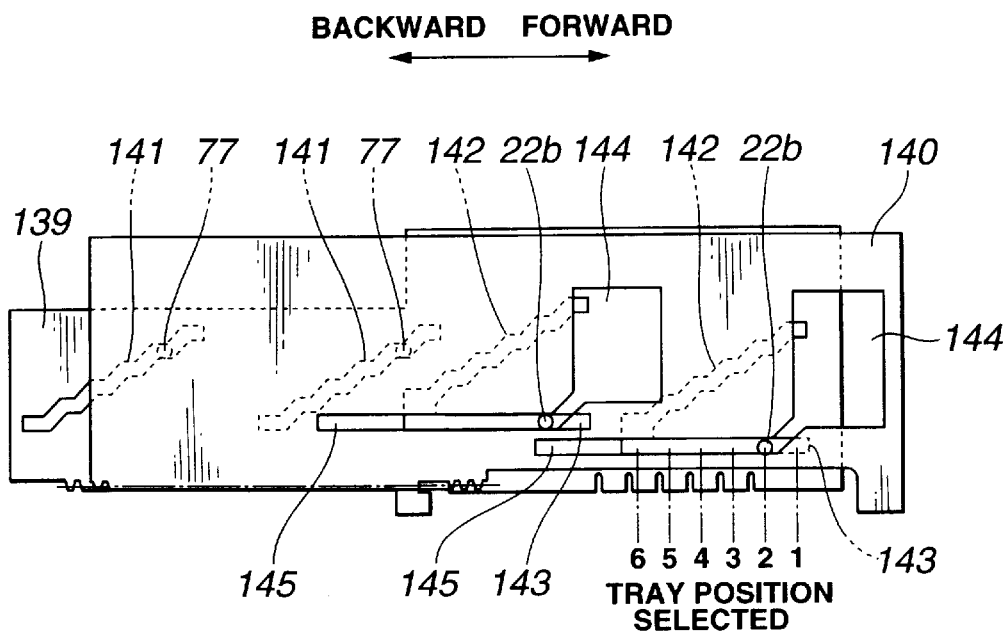
FIG. 16 shows a case of reproducing the second CD from the top, and figure (a) thereof is an operation explaining diagram of the operation means when the pin is at position D in the waiting state and figure (b) thereof is an operation explaining diagram of the operation means when the pin is at position I in the reproducing state.
Figure 16:
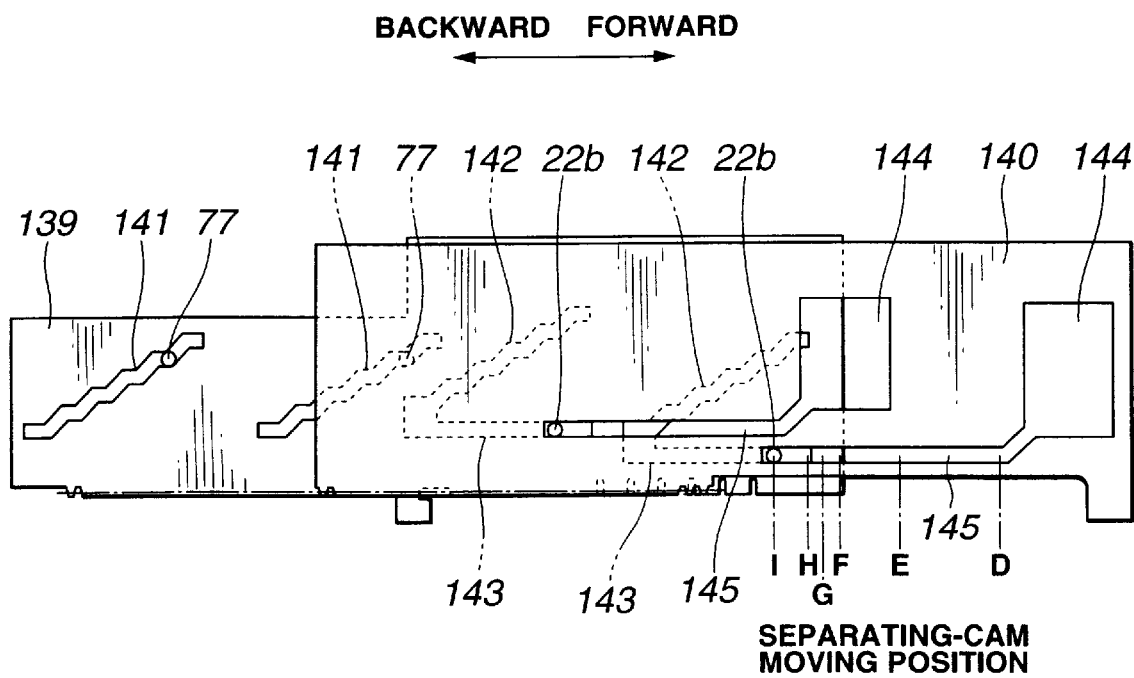

Since a CD of number 2 is selected here as described above, the pair of pins 77 rise to the second position from the top as shown in FIG. 16(a). As a result of the above operation, a CD to be reproduced comes into a state where it can be reproduced, and the operation following this is the same also in case that a CD of any number is selected, and is performed by the movement of the outer slider 140 and the driving of the transfer motor 46.

Figure 23:
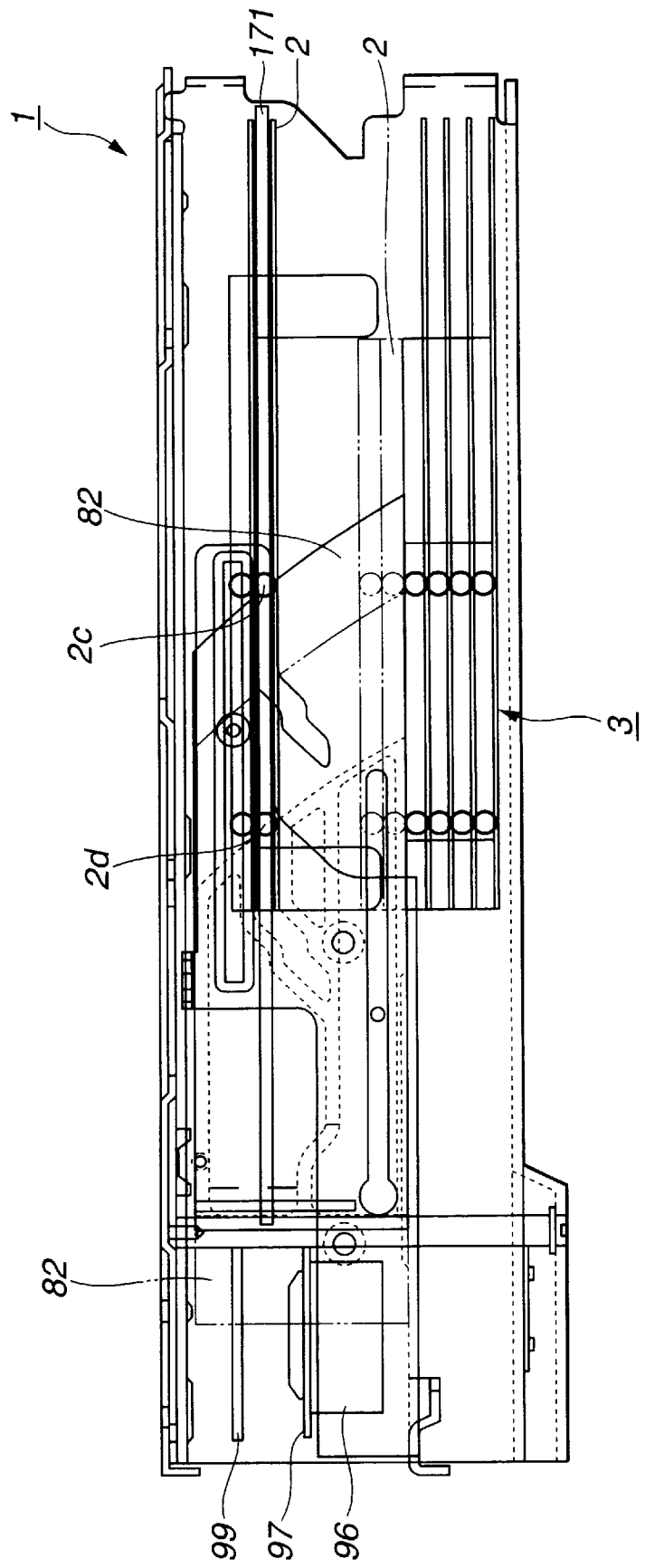
FIG. 23 is a side view showing a state where the trays are separated into two by the separating cam.
Figure 24:
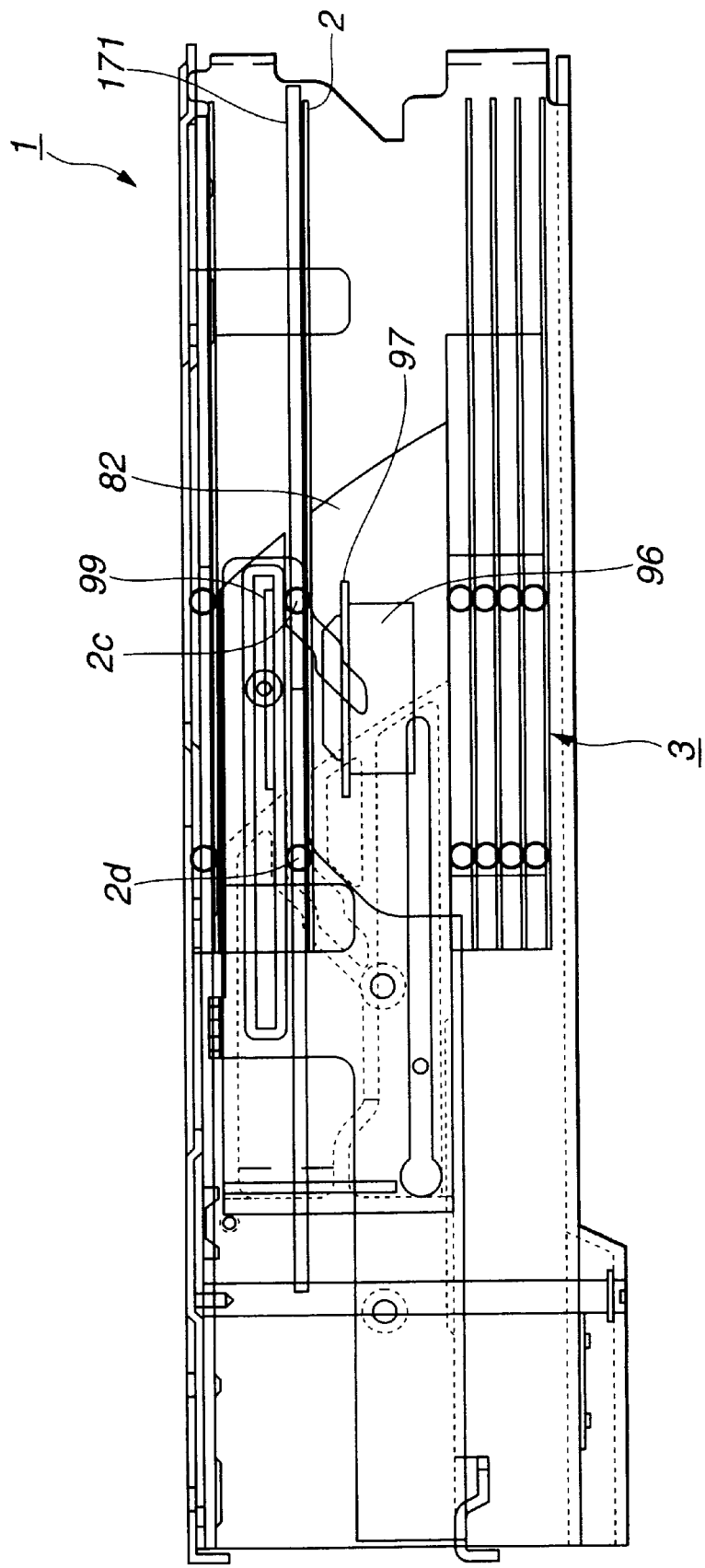
FIG. 24 is a side view showing a state where the trays are separated into three by the separating cam.

The action after the waiting state of FIG. 16(a) in which a CD of number 2 to be reproduced is selected is described in the following. A state where the pin 22b occupies position D on the outer slider 140 of FIG. 16(b), namely, a state of FIG. 16(a) is the waiting state, and at this time the separating cam 82 is at the position of FIG. 22, and when the outer slider 140 moves forward and the pin 22b comes to position E as the first stage, the separating cam 82 moves forward and the lower front end of the backward portion of the separating cam 82 enters between the pins 2d of the second and third trays 2 from the top (as for pins 2c also, the lower front end of the forward portion of the separating cam 82 enters between the pins 2c and the following operation is performed in the same way as pins 2d), and next, when the pin 22b comes to position F as the second stage, the pin 2d of the second tray 2 from the top slides on the first separating control portion 82c1 and mounts the upper stage entering portion 82j and the upper front end of the separating cam 82 enters between the pins 2d of the first and second trays 2 from the top to come into a state of FIG. 23, and next, when the pin 22b comes to position G as the third stage, the pin 2d of the first tray 2 from the top slides on the second separating control portion 82c2 and mounts the upper face 82f of the separating cam 82. Due to this, when the pin 22b comes to position G at the third stage, space is formed over and under the selected second tray 2 from the top as shown in FIG. 24.

When an unshown sensor detects that the pin 22b has come to position G of FIG. 16(b), the transfer motor 46 starts turning. Since a state where the pair of pins 22b enter the bottom slits 143 and the lever 113 of the turning force supplying means 17 is pressed down has been brought when the operation mode is changed over to the reproducing mode as described above, a state has been already brought where the lever 113 is turned counterclockwise around the pin 114 from a state of FIG. 28(a) and the plate 105 rises and the lever 110 is turned clockwise around the shaft 109 and the gear 112 is engaged also with gear 104 as being engaged with the gear 103h as shown in FIG. 28(b).

Figure 29:
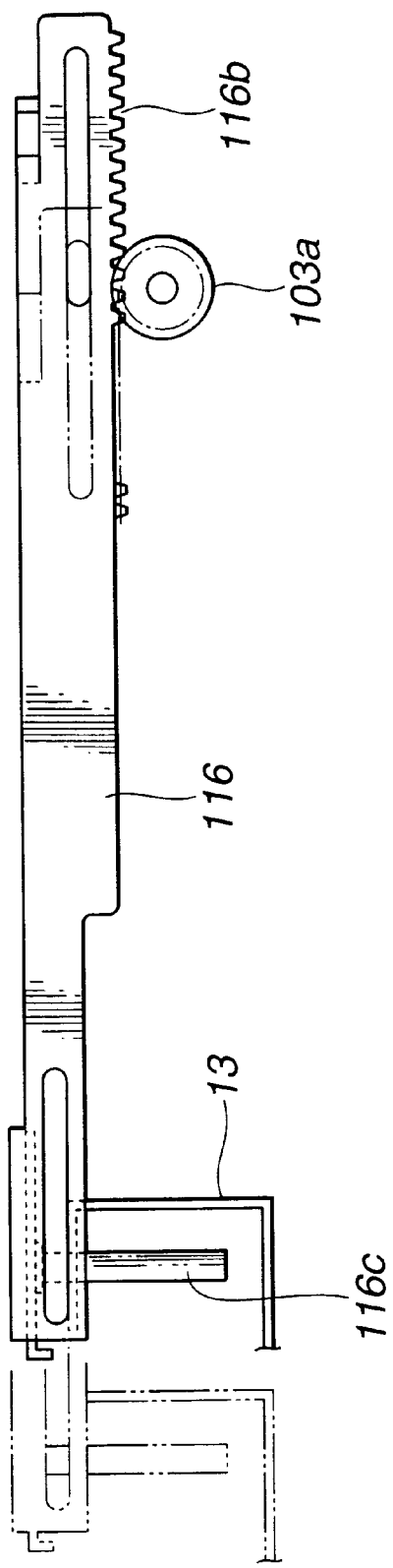
FIG. 29 is an operation explaining diagram showing a state where a turning force is supplied to the holding means.

Accordingly, the rotation of the transfer motor 46 is transferred to the slide bar 116 having a rack 116b through the driving shaft 30 and the gear train 103, and the slide bar 116 moves backward as shown in FIG. 29. Hereupon, since the engaging pin 116c of the lower backward portion of the slide bar 116 is slidably fitted in a slot 13a, the holding means 14 is turned forward and when the positioning pin 119 of FIG. 10(a) passes position c being the inflection point, the pressing force of the toggle spring 120 acts in the opposite direction and the positioning pin 119 is turned to position a as shown in FIG. 10(b), and as shown in FIG. 24, the upper arm 12 and the chuck plate 99, and the lower arm 13 and the turntable 97 come in respectively above and below a CD 171 to be reproduced.

Showing this with plan views, the state is changed over from FIG. 30 to FIG. 31. The transfer motor 46 stops turning due to an unshown limit switch for detecting the turning of the holding means 14.

Figure 25:
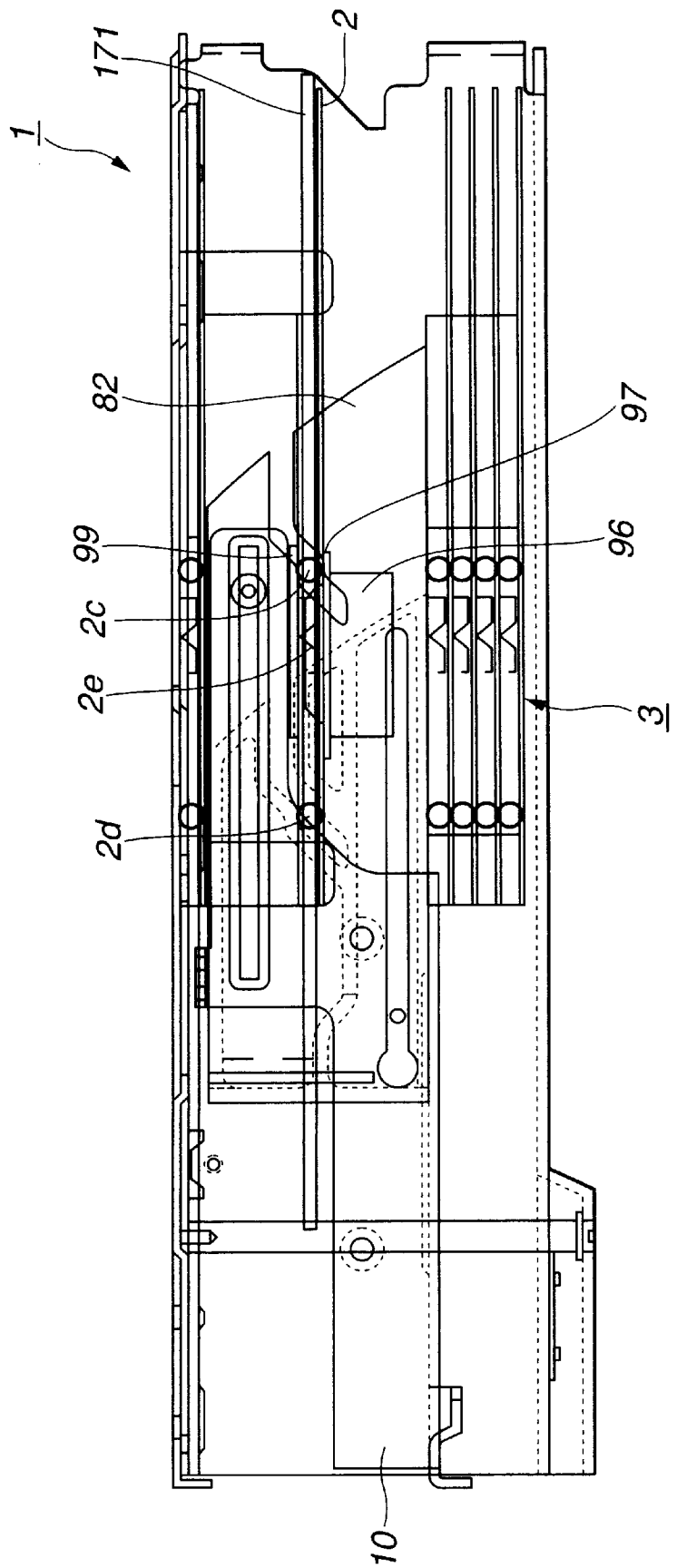
FIG. 25 is a side view showing a state where the trays are separated into three and thereafter only a selected tray descends and a selected CD mounts a turntable and is held by a holding means.

When the outer slider 140 moves forward until the pin 22b comes to position H of FIG. 16(b) as the fourth stage, the pin 2d of the selected tray 2 descends into the intermediate stage entering portion 82k and thereby the selected tray 2 and the selected CD descend and the selected CD mounts the turntable 97 as shown in FIG. 25.

And nearly at the same time as this, the outer slider 140 and the separating cam 82 move forward, and thereby the regulation means 18 operates and the upper arm 12 of the holding means 14 is moved down by the action of the holding spring 89 and the CD to be reproduced is held between the turntable 97 and the chuck plate 99.

That is to say, a detailed description of the holding operation is as follows. When the pin 22b is at position G and the holding means 14 occupies the standby position B, the guide pin 12a is located at the horizontal portion 125a of the guide slot 125 as shown in FIG. 32, and when the holding means 14 occupies the reproducing position A, the guide pin 12a moves to the vertical portion 125b of the guide slot 125 as shown in FIG. 33(a), but since the pin 127a cannot be relieved to the relief part of the cam groove 82r of the separating cam 82, the guide pin 12a cannot descend due to hindrance of the back face of the restriction lever 127.

Next, when the pin 22b moves to position H, since the separating cam 82 also moves forward, the pin 127a can be relieved to the relief portion of the cam groove 82r as shown in FIG. 33(b) and the pin 127a of the restriction lever 127 pressed by the spring 128 moves up toward the relief portion of the cam groove 82r of the separating cam 82 and the backward part of the restriction lever 127 descends. Due to this, as shown FIG. 34 the upper arm 12 pressed by the holding spring 89 descends and the selected CD 171 is held as described above.

The turning center of the holding means 14 is positioned at a high accuracy on the bottom plate 1e by inserting the pole 92 stood on the bottom plate 1e into the hollow shaft 86 being the turning center of the holding means 14, and the positioning pin 119 is held in a state where it is pressed against the pickup elevator 10 by the toggle spring 120, and therefore the turntable 97 and the chuck plate 99 are accurately positioned on a circumferential locus.

On the other hand, since the guide pole 23 for guiding a tray 2 carrying a CD 171 is also stood on the bottom plate 1e in the same way as the pole 92, the CD 171 is also accurately positioned on the bottom plate 1e. Therefore, the center of the CD 171 to be reproduced, the center of the turntable 97 and the center of the chuck plate 99 coincide accurately with one another, and the CD 171 is securely held.

Figure 26:
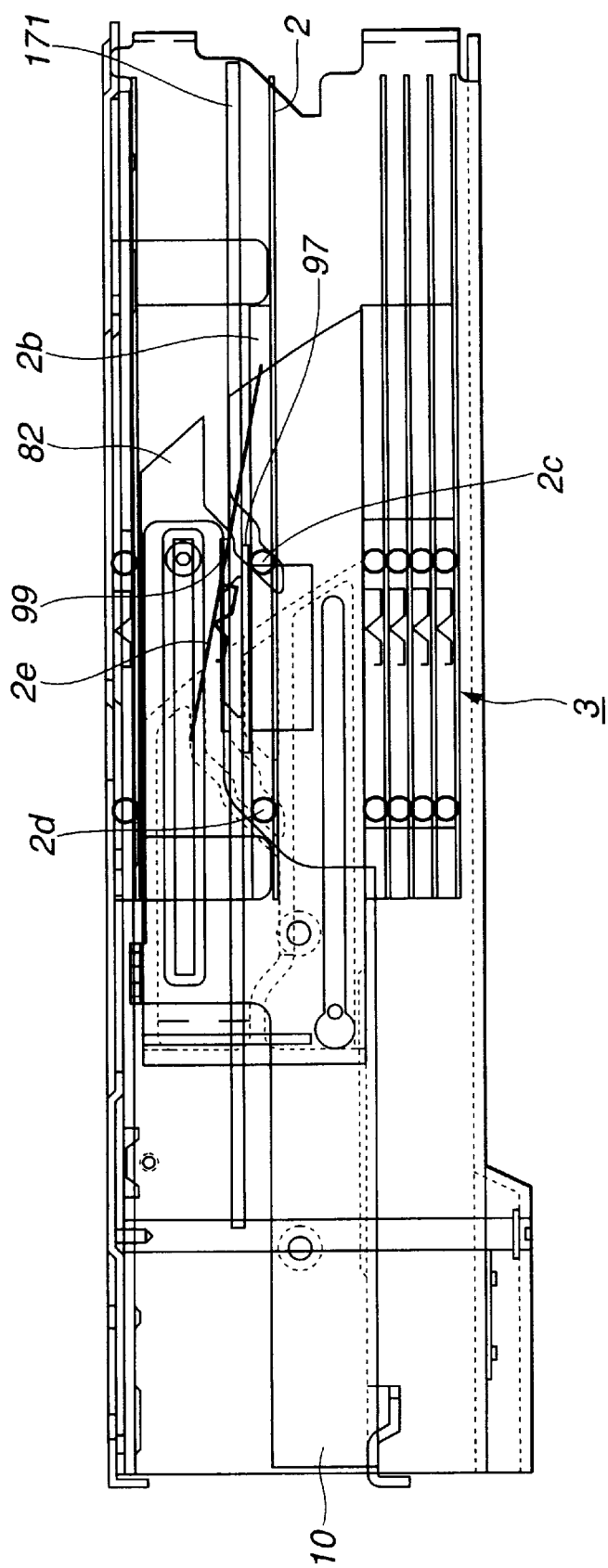
FIG. 26 is a side view showing a state where the selected CD is held by the holding means and thereafter only the selected tray descends again and leaves the selected CD.
Figure 27:
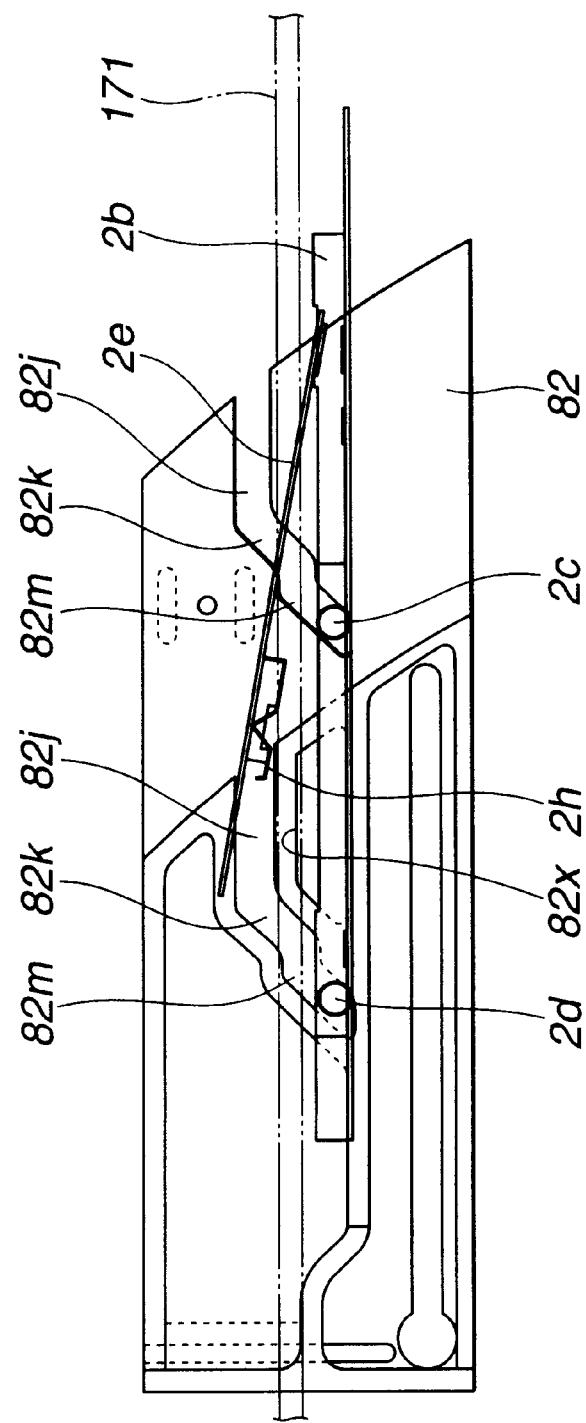
FIG. 27 is an explanatory diagram showing a state where a plate spring of the selected tray rises and the selected CD is released at the time of reproducing.

As the final fifth stage, when the outer slider 140 moves forward until the pin 22b comes to position I of FIG. 16(b), the pin 2d of the selected tray 2 descends into the lower stage entering portion 82m as shown in FIG. 21(a) and the selected tray 2 which has been in contact with the selected CD until that time descends as shown in FIG. 26 to leave the selected CD 171 and at the same time, the receiving portion 2h of the plate spring 2e which has pressed the selected CD 171 is pushed up by the lower face of the upper stage entering portion 82j of the backward portion of the separating cam 82 and thereby the selected CD is released as shown in FIG. 27.

Since at this time the trays 2 under the selected tray 2 are pressed by the underside 82h of the separating cam 82 and the trays 2 over the selected tray 2 are pressed down by the coil spring 24, the trays 2 are prevented from vibration caused by vibration of a vehicle.

After the selected CD is held by the holding means 14 in such a way, the CD is reproduced in a state where the holding means 14 is held at position A as shown in FIG. 31. When the spindle motor 96 rotates first, the CD is rotated through the turntable 97.

Next, when a motor 165 for scanning the pickup unit 16 rotates, its rotation is transferred to the screw shaft 164 and the optical pickup 162 moves along the screw shaft 164 from the inside toward the outside in a radial direction of the CD, and the reproducing of the CD is performed.

After the CD has been reproduced, when the screw shaft 164 is reversely turned and the optical pickup 162 returns to its original position, the scanning motor 165 stops turning and the spindle motor 96 also stops turning. After this, according to a reverse procedure to the above-mentioned procedure, the outer slider 140 moves backward and the separating cam 82 also moves backward.

And as shown in FIG. 21(b), when the pin 127a returns from position H to position G, the pin 127a of the restriction lever 127 which has been at the position of FIG. 33(b) comes off from the relief portion of the separating cam and moves down as shown in FIG. 33(a) and the backward part of the restriction lever 127 moves up. Due to this, the guide pin 12a projecting outside from the holding means 14 is pushed up along the vertical portion 125b of the guide slot 125 and the holding means 14 comes into a state where it can be turned.

After this, an unshown sensor detects that the guide pin 12a has moved up, the transfer motor 46 is turned in the reverse direction to the above-mentioned direction and the holding means 14 is turned to the backward side. And when the positioning pin 119 which has occupied position a of FIG. 10(b) passes position c being the inflection point, the pressing force of the toggle spring 120 acts in the opposite direction and turns the positioning pin 119 to position b as shown in FIG. 10(a), and the holding means 14 returns to position B being the standby position.

Due to an unshown limit switch for detecting the turning of the holding means 14, the transfer motor 46 stops turning. Since the holding means 14 is pressed backward by the toggle spring 120 even at the standby position, it is not influenced by vibration of the vehicle.

Figure 22:
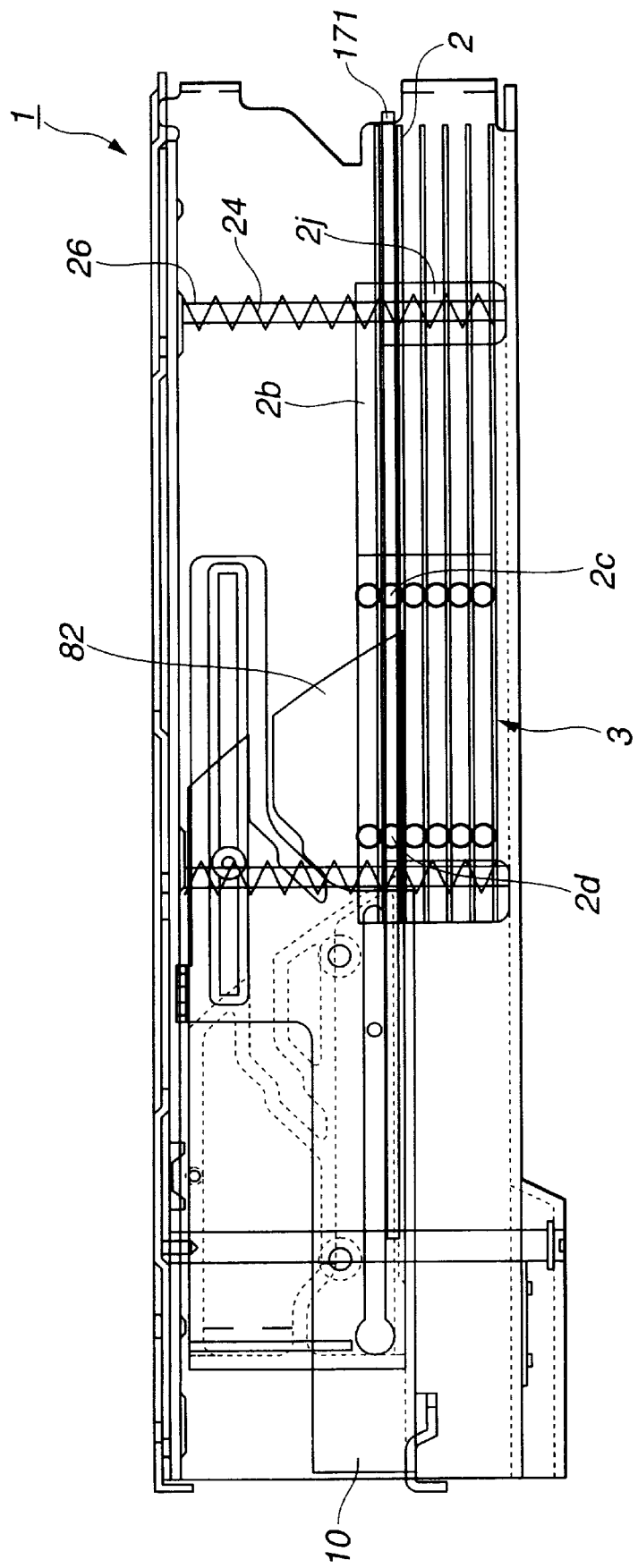
FIG. 22 is a side view showing a state before the separating cam separates the trays.

After this, when the outer slider 140 moves backward and the pin 22b returns to the standby position D of FIG. 16(b), the separating cam 82 also moves backward and all the first to third trays 2 descend and return to the state of FIG. 22 where the six trays 2 are not separated.

In case of reproducing a CD other than the second CD from the top, the inner slider 139 is made to move forward or backward from the state of FIG. 16(a) and the pin 22b is made to relatively move to one of positions 1, 3, 4, 5 and 6 given to the inner slider 139 in the figure, and thereafter the outer slider 140 is slid and positions D to I on the outer slider 140 of FIG. 16(b) are fitted to the pin 22b in order, and thereby the same operation as described above can be repeated.

As described above, the respective operations of recording, reproducing and ejection can be performed only by means of the first and second control plate and the space forming means, and the apparatus composition can be greatly simplified.

And since the first and second control plate move in a direction perpendicular to the direction of stacking the disc carrying means in the disc storing portion, it is enough that the thickness of the apparatus is nearly the thickness necessary for the disc carrying means to move in the stacking direction, and therefore the whole apparatus can be made thin-shaped.

And by making said changeover slit 146 (mode changeover portion) longer, it is possible to make higher the lowest position of the insertion/ejection mode slit 144 and make the disc elevator 22 stay at a higher position when the pin 22b comes to the position of FIG. 12. Due to this, it is possible to make higher the insertion/ejection opening 4 for a CD.

And the above-mentioned embodiment has assumed that the number of trays forming the disc storing portion is six, but it may be less or more than six. And furthermore, this embodiment uses trays shown in FIGS. 3 and 4, but may use a pair of carrying pieces obtained by cutting out portions shown by the alternate long and two short dashes lines in the figure, leaving only both side portions carrying the outer circumferential portion of a CD and removing the middle part of the aluminum plate 2a.

INDUSTRIAL APPLICABILITY

The above-mentioned embodiment is a disc player for reproducing a sound which a disc recording and/or reproducing apparatus of the present invention is applied to, but the present invention is not limited to this but may be applied to an apparatus for recording a sound, an apparatus for recording and reproducing a sound, or an apparatus for recording and/or reproducing not only a sound but also an image. And the above-mentioned embodiment has been described on the assumption that the direction in which trays are stacked one over another is the vertical direction, but the direction in which trays are stacked one over another may be the horizontal direction. This embodiment uses a disc of 12 cm in size, but can be also applied to a disc having another size such as 8 cm or the like.

What is claimed is:

1. A disc recording and/or reproducing apparatus comprising:
    a disc storing portion having a plurality of disc carrying means configured to have a disc placed thereon, said disc carrying means being stacked one over another;
    a driving portion which is apart by a specified distance from said disc carrying means in a direction perpendicular to the stacking direction of said disc carrying means, faces said disc storing portion, is disposed so as to move in the same direction as said stacking direction, and holds and rotationally drives a disc;
    a first control plate which moves in a direction nearly perpendicular to the stacking direction of said disc carrying means and makes said disc storing portion and said driving portion move in said stacking direction;
    a space forming means which makes a disc carrying means adjacent to a desired disc carrying means in said disc storing portion move in the stacking direction and forms a specified space at least at one side of the desired disc carrying means in the stacking direction; and
    a second control plate which is coupled to said space forming means and moves in a direction perpendicular to said stacking direction.

2. A disc recording and/or reproducing apparatus according to claim 1, wherein said first control plate has a position control portion for controlling said disc storing portion and said driving portion to move to a desired position in said stacking direction according to the distance of its movement.

3. A disc recording and/or reproducing apparatus according to claim 2, wherein said second control plate has a mode changeover portion having a specified length for changing over the operation mode of said first control plate between a mode for moving said disc storing portion and a mode for moving only said driving portion.

4. A disc recording and/or reproducing apparatus according to claim 3, wherein said space forming means and said second control plate are coupled to each other so that they can move in said stacking direction.

5. A disc recording and/or reproducing apparatus according to claim 4, wherein said first control plate comprises a pair of first control plates driven by a first driving source, and said second control plate comprises a pair of second control plates being driven by a second driving source.

6. A disc recording and/or reproducing apparatus according to claim 3, wherein said first control plate comprises a pair of first control plates being driven by a first driving source and said second control plate comprises a pair of second control plates being driven by a second driving source.

7. A disc recording and/or reproducing apparatus according to claim 2, wherein said space forming means and said second control plate are coupled to each other so that they can move in said stacking direction.

8. A disc recording and/or reproducing apparatus according to claim 7, wherein said first control plate comprises a pair of first control plates driven by a first driving source and said second control plate comprises a pair of second control plates driven by a second driving source.

9. A disc recording and/or reproducing apparatus according to claim 2, wherein said first control plate comprises a pair of first control plates being driven by a first driving source and said second control plate comprises a pair of second control plates being driven by a second driving source.

10. A disc recording and/or reproducing apparatus according to claim 1, wherein said second control plate has a mode changeover portion having a specified length for changing over the operation mode of said first control plate between a mode for moving said disc storing portion and a mode for moving only said driving portion.

11. A disc recording and/or reproducing apparatus according to claim 10, wherein said space forming means and said second control plate are coupled to each other so that they can move in said stacking direction.

12. A disc recording and/or reproducing apparatus according to claim 11, wherein said first control plate comprises a pair of first control plates driven by a first driving source, and said second control plate comprises a pair of second control plates driven by a second driving source.

13. A disc recording and/or reproducing apparatus according to claim 10, wherein said first control plate comprises a pair of first control plates being driven by a first driving source and said second control plate comprises a pair of second control plates being driven by a second driving source.

14. A disc recording and/or reproducing apparatus according to claim 1, wherein said space forming means and said second control plate are coupled to each other so that they can move in said stacking direction.

15. A disc recording and/or reproducing apparatus according to claim 14, wherein said first control plate comprises a pair of first control plates driven by a first driving source and said second control plate comprises a pair of second control plates being driven by a second driving source.

16. A disc recording and/or reproducing apparatus according to claim 1, wherein said first control plate comprises a pair of first control plates being driven by a first driving source and said second control plate comprises a pair of second control plates being driven by a second driving source.

* * * * *